United States Patent
Konishi et al.

(10) Patent No.: US 8,659,838 B2
(45) Date of Patent: Feb. 25, 2014

(54) IMAGE PICKUP LENS, IMAGE PICKUP DEVICE PROVIDED WITH IMAGE PICKUP LENS, AND MOBILE TERMINAL PROVIDED WITH IMAGE PICKUP DEVICE

(75) Inventors: Hirotoshi Konishi, Osaka (JP); Taizo Wakimura, Kishiwada (JP); Satoshi Onishi, Amagasaki (JP); Keiji Matsusaka, Osaka (JP); Mitsuhiko Morita, Sakai (JP); Eigo Sano, Hino (JP); Hiroaki Tanaka, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 126 days.

(21) Appl. No.: 13/376,347

(22) PCT Filed: Mar. 11, 2010

(86) PCT No.: PCT/JP2010/054095
§ 371 (c)(1),
(2), (4) Date: Dec. 5, 2011

(87) PCT Pub. No.: WO2010/143459
PCT Pub. Date: Dec. 16, 2010

(65) Prior Publication Data
US 2012/0075721 A1  Mar. 29, 2012

(30) Foreign Application Priority Data
Jun. 8, 2009 (JP) .................................. 2009-137599

(51) Int. Cl.
*G02B 3/02* (2006.01)
*G02B 9/00* (2006.01)
*G02B 13/18* (2006.01)

(52) U.S. Cl.
USPC ............................................ 359/714; 359/764

(58) Field of Classification Search
CPC .............. G02B 9/60; G02B 9/62; G02B 9/64; G02B 13/18
USPC .......... 359/708, 713, 714, 754–758, 763–766
See application file for complete search history.

(56) References Cited

U.S. PATENT DOCUMENTS

| 3,815,974 | A | * | 6/1974 | Momiyama | 359/765 |
| 4,274,711 | A | * | 6/1981 | Matsuo | 359/758 |
| 4,721,371 | A | * | 1/1988 | Imai | 359/689 |
| 4,768,868 | A | * | 9/1988 | Wakamiya et al. | 359/754 |
| 4,856,881 | A | * | 8/1989 | Shiraishi | 359/755 |
| 7,912,362 | B2 | * | 3/2011 | Lim et al. | 396/55 |

FOREIGN PATENT DOCUMENTS

| JP | 61-138225 | 6/1986 |
| JP | 62-56916 | 3/1987 |
| JP | 62-177512 | 8/1987 |
| JP | 1-179007 | 7/1989 |

(Continued)

*Primary Examiner* — Darryl J Collins
(74) *Attorney, Agent, or Firm* — Cozen O'Connor

(57) ABSTRACT

Provided is an image pickup lens that forms an image on an image pickup element with light from a subject. In the image pickup lens, a lens that is disposed on an image pickup element side is fixed in position, and a focusing lens group having a plurality of lenses including a lens closest to the subject is moved in an optical axis direction, thereby performing focusing.

15 Claims, 19 Drawing Sheets

(56) References Cited

FOREIGN PATENT DOCUMENTS

| | | |
|---|---|---|
| JP | 1-252913 | 10/1989 |
| JP | 3-249719 | 11/1991 |
| JP | 6-94992 | 4/1994 |
| JP | 2006-119260 | 5/2006 |
| JP | 2006-119319 | 5/2006 |
| JP | 2007-263505 | 10/2007 |
| JP | 2008-197582 | 8/2008 |
| JP | 2008-242180 | 10/2008 |
| JP | 2008-243810 | 10/2008 |

\* cited by examiner

IMAGE PICKUP LENS, IMAGE PICKUP DEVICE PROVIDED WITH IMAGE PICKUP LENS, AND MOBILE TERMINAL PROVIDED WITH IMAGE PICKUP DEVICE

RELATED APPLICATIONS

This application is a U.S. National Phase Application under 35 USC 371 of International Application PCT/JP2010/054095 filed Mar. 11, 2010.

This application claims the priority of Japanese application No. 2009-137599 filed Jun. 8, 2009, the entire content of which is hereby incorporated by reference.

TECHNICAL FIELD

The present invention relates to an image pickup lens which can guide light to an image pickup element, an image pickup device provided with the image pickup element and a mobile terminal provided with the image pickup device. Especially, the present invention relates to an image pickup lens which can perform a focusing operation, an image pickup device provided with the image pickup element, and a mobile terminal provided with the image pickup device.

BACKGROUND ART

Until now, a small and thin image pickup device has become mounted on a mobile terminal such as a cell phone and a PDA (Personal Digital Assistant). Thereby, not only sound information, but also image information can be mutually transmitted to/from a remote place. As an image pickup element for use in such the image pickup device, there are used CCD (Charge Coupled Device) type image sensor and CMOS (Complementary Metal-Oxide Semiconductor) type image sensor. In recent years, demands for adopting an auto-focusing function in these image pickup devices are increasing additionally to demands for furthermore downsizing them.

In order to achieve an auto-focusing function, for example in Patent Literature 1, an image pickup device for use in a mobile phone is configured to move an image pickup lens along the optical axis to adjust the focus to a subject. The image pickup device includes an image pickup lens composed of plural lenses, a lens holder for holding the image pickup lens, a rotary tube screwed with the lens holder, and a stepping motor for rotating the rotary tube. When the stepping motor rotates the rotary tube, the lens holder straightly moves in the optical axis direction and the image pickup lens moves on the optical axis up to a best focus position and stops. As described above, the auto-focusing function is performed.

However, in the above prior art, a rotary tube is arranged at the outer circumference side of the image pickup lens and a stepping motor is further arranged at the outside of the rotary tube, which makes the image pickup lens large in size in the radial direction. Further, in the prior art, lenses at the side of the image pickup element also straightly move in the optical axis direction together with the lens holder. Therefore, the air flows into a space around an image plane corresponding to a movement of lenses at the side of the image pickup element, and dust can adhere to an area around the image plane.

In Patent Literature 2, in order to downsize an image pickup device, the image pickup lens includes, in order form a subject, an aperture stop, a first lens with positive power, a second lens with negative power, a third with positive power, and a fourth lens with negative power, wherein a focusing operation is performed by moving only the first lens in the optical axis direction. Because the first lens is a lens with the smallest outside diameter, the image pickup device is not enlarged even when an actuator is arranged outside the first lens in the radial direction.

In recent years, as for an image pickup device, corresponding to an increase of the number of pixels of an image pickup element, demands of enhanced resolution on an image pickup lens is increasing, additionally to a demand of downsizing on an image pickup device. Especially, enhancement of optical properties such as a MTF (Modulation Transfer function) characteristic at image pickup at a close distance such as macro-photography, and an image pickup lens with a small Fno (excellent lens speed) are required. However, to meet the demands, the above prior art employs a focusing operation wherein only the first lens is moved, which significantly deteriorates the MTF characteristic at a large-image-height position on an image plane of the image pickup element (off-axis position), with respect to that at an axial position. Further, when performing a focusing operation, the image pickup lens can move and be displaced from the optical axis due to a drive mechanism of lenses. When a focusing lens is decentered, especially it is tilted with respect to the optical axis (tilt decentration), a focal point at a off-axis position is shifted in comparison with an axial position, and the MTF characteristic is deteriorated corresponding to the focusing operation. Especially in an image pickup lens with a small Fno, the MTF characteristic is significantly deteriorated. An influence of the tilt decentration on the optical properties such as the MTF characteristic (decentration sensitivity) becomes significantly great when a single lens is moved. Accordingly, because only the first lens is moved in the prior art, there was problems that the decentration sensitivity becomes large, optical properties is deteriorated and it is hardly applied to an image pickup lens with a small Fno.

CITATION LIST

Patent Literature

Patent Literature 1: JP-A No. 2006-91067 (Paragraphs [0016] and [0021] to [0023], FIG. 4)
Patent Literature 2: JP-A No. 2007-47266 (Paragraph [0034], FIG. 2)

SUMMARY OF INVENTION

Technical Problem

The present invention has been achieved to solve the above problems, and aims to provide an image pickup lens, a small image pickup device equipped with the image pickup lens; and a mobile terminal equipped with the image pickup device, wherein the image pickup lens is small-sized, and a desentration sensitivity coming from a lens tilt is controlled and the optical properties are excellent in the situations including image pickup at a close distance.

Solution to Problem

1. An image pickup lens for forming light from a subject into an image on an image pickup element, the image pickup lens characterized in that a lens closest to the image pickup element is stationarily disposed, and a focusing operation is performed by moving a focusing lens group including a plurality of lenses in a direction of an optical axis, where the plurality of lenses include a lens closest to the subject.

2. The image pickup lens of Item 1, characterized in that the focusing lens group comprises three lenses.

3. The image pickup lens of Item 1 or 2, characterized in that the lens closest to the subject has a diameter which is smaller than a diameter of the lens closest to the image pickup element.

4. The image pickup lens of any one of Items 1 to 3, characterized by satisfying.

$$0.4 < Y/TL < 0.8,$$

where Y is a maximum image height on an image plane of the image pickup element, and TL is a distance on an optical axis from a surface vertex of a lens surface closest to the subject to the image plane, when a subject at an infinite distance is in focus.

5. The image pickup lens of any one of Items 1 to 4, characterized by satisfying:

$$0.5 < fm/f < 1.5,$$

where fm is a focal length of the focusing lens group and f is a focal length of a total system of the image pickup lens.

6. The image pickup lens of any one of Items 1 to 5, characterized by satisfying:

$$1 < |fmi/f| < 15,$$

where fmi is a focal length of a lens closest to the image in the focusing lens group and f is a focal length of a total system of the image pickup lens.

7. The image pickup lens of any one of Items 1 to 6, characterized by satisfying:

$$0.3 < rm/rf < 5,$$

where rm is a curvature radius of a lens surface closest to the image in the focusing lens group and rf is a curvature radius of a lens surface closest to the subject among lenses stationarily disposed.

8. The image pickup lens of any one of Items 1 to 7, characterized by comprising in order from the subject: a first lens with positive power, comprising a convex surface facing the subject; a second lens with negative power; a third lens with positive or negative power, a fourth lens with positive or negative power; and a fifth lens comprising one surface in an aspheric shape including an inflection point at a position excluding an intersection of the one surface and the optical axis.

9. The image pickup lens of any one of Items 1 to 8, characterized by comprising in order from the subject: a first lens with positive power, comprising a convex surface facing the subject; a second lens with negative power, comprising a concave surface facing the image; a third lens with positive or negative power; a fourth lens with positive power, comprising a convex surface facing the image; and a fifth lens with negative power, comprising a concave surface facing the image, wherein the focusing lens group consists of the first to third lenses.

10. The image pickup lens of any one of Items 1 to 8, characterized by comprising in order from the subject: a first lens with positive power, comprising a convex surface facing the subject; a second lens with negative power, comprising a concave surface facing the subject; a third lens with positive power; a fourth lens with positive or negative power; and a fifth lens with positive or negative power, wherein the focusing lens group consists of the first to fourth lenses.

11. An image pickup device characterized by comprising: the image pickup lens of any one of Items 1 to 10; and an actuator for driving the focusing lens group.

12. The image pickup device of Item 11, characterized in that the image pickup lens includes at least five lenses.

13. The image pickup device of Item 11 or 12, characterized in that the actuator comprises a piezoelectric element.

14. The image pickup device of Item 11 or 12, characterized in that the actuator comprises a voice coil motor.

15. The image pickup device of Item 11 or 12, characterized in that the actuator comprises shape memory alloy.

16. A mobile terminal characterized by comprising the image pickup device of any one of Items 11 to 15.

Advantageous Effects of Invention

According to the structure described in Item 1, the focusing lens group is composed of plural lenses. Therefore, by arranging lenses in the focusing lens group so as to cancel the decentration sensitivities of respective lenses mutually, the decentration sensitivity of the total system of the image pickup lens can be decreased. When the decentration sensitivity of the total system of the image pickup lens is decreased, deterioration of optical properties coming from decentration sensitivities in a process of manufacturing lenses and structural members and a process of assembling lenses and structural members can be controlled. Further, an amount of lens movement for performing image pickup at a close distance becomes small, which shortens the total length of the image pickup lens, forms a space where a lens drive mechanism is arranged at the outer circumference side of the focusing lens group, downsizes the image pickup lens in the radial direction, and downsizes an image pickup device where an image pickup lens is to be mounted. Further, by disposing a lens facing the image pickup element stationarily, a load of a motor of the lens drive mechanism can be reduced.

When the lens facing the image pickup element is stationarily disposed, the space around the image plane can be enclosed with the lens facing the image pickup element and the image pickup element, which reduces dust adhering around the image plane. Even when dust enters the inside of the image pickup lens, it adheres to a subject-side surface of a stationary lens including the lens facing the image pickup element. Since the dust is located away from the image plane, there is no fear that the optical properties are deteriorated. Further, since the lens facing the image pickup element is not required to be moved in the focusing operation and the lens drive mechanism is not required to be arranged at the outer circumference side of a lens with a large outer diameter, the image pickup apparatus can be downsized in the radial direction.

According to the structure described in item 2, by providing at least three lenses as a focusing lens group, the decentration sensitivity of the focusing lens group is reduced and fluctuation of various aberrations caused in a focusing operation is controlled, which makes the optical properties excellent.

To control the fluctuation of optical properties corresponding to the distance to the subject, it is required to correct various aberrations as much as possible in a movable group. By setting the number of lenses to be three, especially field curvature and astigmatism are corrected in excellent conditions. Preferably, there are arranged a positive lens, negative lens and positive lens, in this order. Such the structure is called as a triplet type and is suitable to correct spherical aberration and distortion, additionally to the above aberrations.

According to the structure described in item 3, there is formed a space where the lens drive mechanism is arranged at the outer circumference side of the lens closest to the subject, which downsizes the image pickup device wherein the image pickup lens is mounted.

According to the structure described in item 4, when the value of the expression (1) exceeds the upper limit, fluctuation of optical properties caused when image pick up from an infinite distance to close distance is performed is hardly controlled. Further, it makes reduction of decentration sensitivity difficult, and deterioration of optical properties coming from manufacturing errors of lenses and structural components and assembling errors of lenses and structural components becomes significant. On the other hand, when the value becomes lower than the lower limit of the expression (1), power of the focusing lens group becomes weak. Therefore, the movement amount of the focusing lens group for performing image pickup at a close distance becomes large, and the total length of the image pickup lens is hardly shortened. When the expression (1) is satisfied, optical properties is controlled when images are picked up in the range from an infinite distance to a close distance, and the movement amount of the focusing lens group becomes a proper value.

According to the structure described in item 5, when the value of expression (2) exceeds the upper limit, the power of the focusing lens group becomes excessively weak, which enlarges the movement amount of the focusing lens group for image pickup at a close distance and makes a reduction of the total length of the image pickup lens difficult. On the other hand, when the value of the expression (2) becomes less than the lower limit, the power of the focusing lens group becomes excessively strong. Therefore, even when the focusing lens group is composed of plural lenses, the decentration sensitivity is hardly reduced, and deterioration of optical properties coming from manufacturing errors of lenses and structural components and assembling errors of lenses and structural components becomes significant. When the expression (2) is satisfied, the movement amount of the focusing lens group becomes a proper value and the decentration sensitivity of the focusing lens group is reduced.

According to the structure described in item 6, under each of the condition that the value exceeds the upper limit of the expression (3) and the condition that the value becomes below the lower limit of the expression (3), corresponding to the movement of the focusing lens group on the optical axis, fluctuation of the height of a ray entering the stationary lens group arranged at the rear of the focusing lens group becomes great. Therefore, field curvature increases and optical properties are deteriorated. When the expression (3) is satisfied, increase of the field curvature caused by the focusing operation can be controlled.

According to the structure described in item 7, under each of the condition that the value exceeds the upper limit of the expression (4) and the condition that the value becomes below the lower limit of the expression (4), fluctuation of optical properties caused in a focusing operation becomes great, and especially, fluctuation of spherical aberration and off-axis coma becomes great, which deteriorates the optical properties. When the expression (4) is satisfied, fluctuation of optical properties caused in the focusing operation, especially fluctuation of spherical aberration and off-axis coma can be controlled.

According to the structure described in item 8, by providing the fifth lens which has an aspheric-surface shape including an inflection point at the periphery, various aberrations at the periphery of an image area can be corrected in excellent conditions and telecentricity of a light flux entering the image plane is secured. Therefore, even in the image pickup lens including five lenses, its size becomes small and shading is controlled.

According to the structure described in item 9, by providing so-called a telephoto-type lens structure that the first to fourth lenses form positive composite power and negative power is arranged as the fifth lens, the total length of the image pickup lens is shortened. Further, by arranging two negative lenses to increase the number of surfaces with light-diverging functions, Petzval's sum can be corrected and excellent image-forming properties can be secured up to the periphery of the image area. Further, by moving the first to third lenses together as one body in a focusing operation, excellent optical properties can be ensured when an image is picked up at a close distance and the decentration sensitivity of the focusing lens group can be reduced, which results in reduction of the deterioration of optical properties coming from the decentration sensitivity.

According to the structure described in item 10, by providing positive power to the first lens and the third lens to make the power of the image pickup lens strong, the total length of the image pickup lens can be shortened and the movement amount of the focusing lens group can be reduced. Even when the power of the focusing lens group becomes strong, decentration sensitivity of the total system of the focusing lens group can be reduced by arranging the first to fourth lenses so as to cancel their decentration sensitivities each other. Generally, when the positive power of the first lens is reduced, off-axis light enters the second lens at a large inclination angle. However, by forming the subject-side lens surface of the second lens into a concave surface to reduce an angle between the upper ray of off-axis light and the normal line of the lens surface, generation of off-axis aberrations is controlled. Thereby, the light amount at the periphery can be secured. Further, by moving the first to fourth lenses together as one body in the focusing operation, optical properties obtained when an image is picked up at a close distance can be secured in an excellent condition and the decentration sensitivity of the focusing lens group group can be reduced, which control the deterioration of optical properties coming from the decentration sensitivity.

According to the structure described in item 11, an actuator can be arranged at the outer-circumference side of the focal lens group with a small outer diameter. Therefore, the image pickup device can be downsized in the radius direction.

According to the structure described in item 12, the image pickup lens includes at least five lenses, which reduces the decentration sensitivity of the focusing lens group, enables to reduce the deterioration of the optical properties coming from the decentration sensitivity and maintains optical properties at both of image pickup at an infinite distance and image pickup at a close distance in excellent conditions.

According to the structure described in item 13, an actuator can be driven with high accuracy by including a piezoelectric element, which enables to downsize the image pickup device.

According to the structure described in item 14, actuator can be driven with high accuracy at high speed by including a voice coil motor, which enables to downsize the image pickup device.

According to the structure described in item 15, actuator can be driven with high accuracy by including shape memory alloy, which enables to downsize the image pickup device.

According to the structure described in item 16, there can be provided a mobile terminal equipped with an image pickup device which is small-sized, enables the decentration sensitivity caused by a lens tilt, and has enhanced optical properties in the situations including image pickup at a close distance.

DESCRIPTION OF EMBODIMENTS

Embodiments of the present invention will be described below referring with drawings. However, the scope of the invention is not limited to the embodiments. Uses of the invention and wordings described in the embodiments are not limited to those in the embodiments, too.

Figure 1:
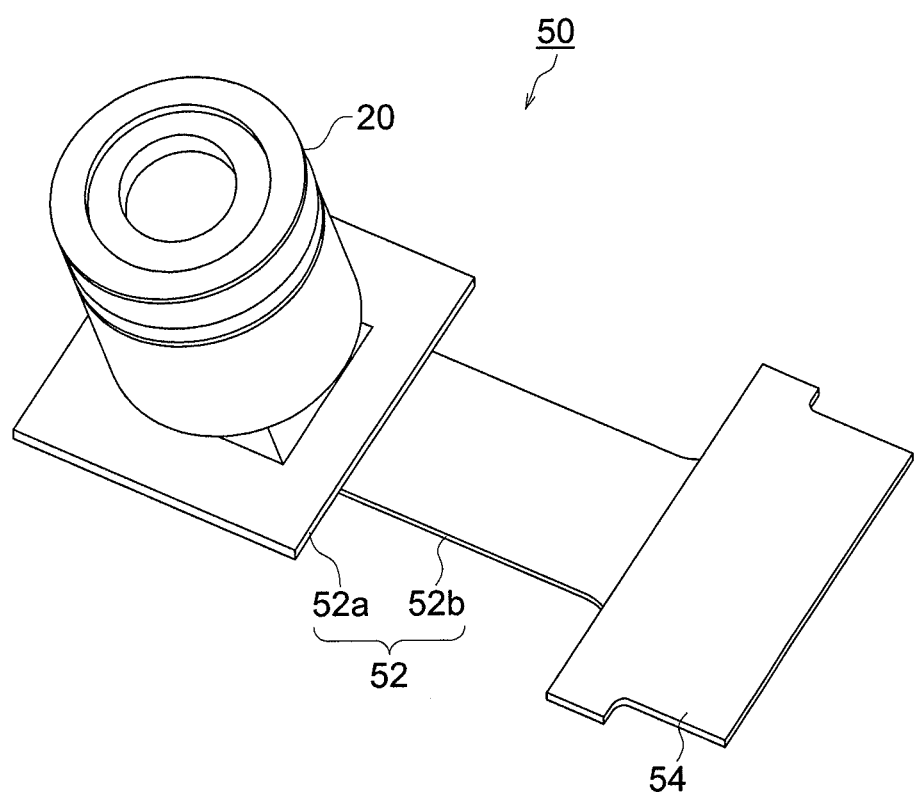
FIG. 1 shows a perspective view illustrating an example of an image pickup device relating to an embodiment of the present invention.
Figure 2:
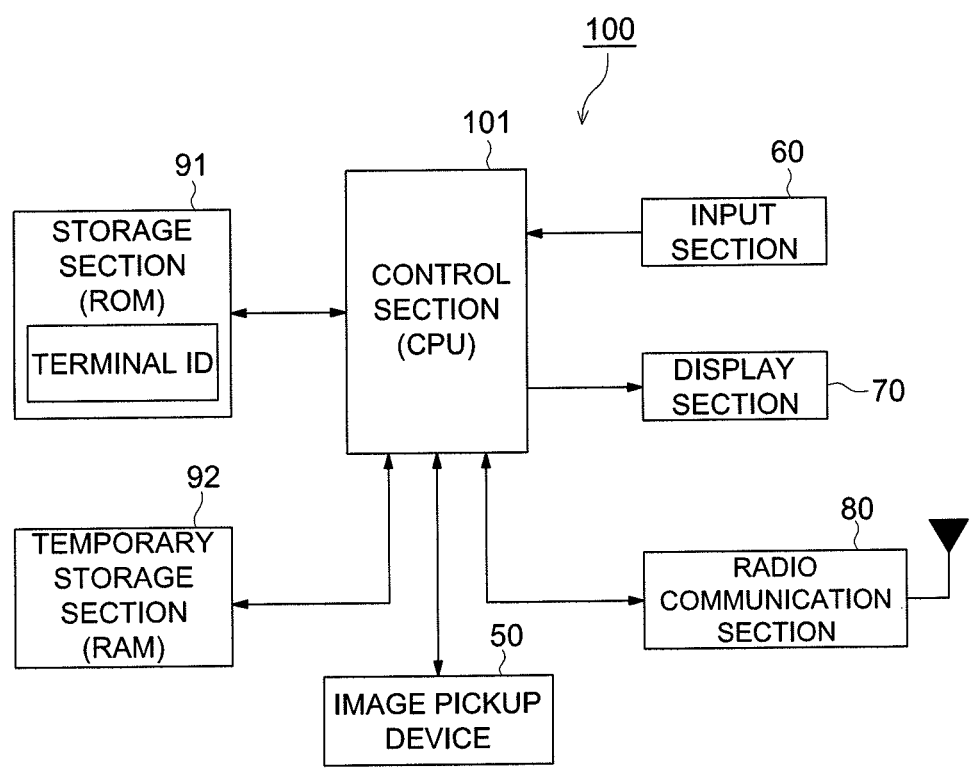
FIG. 2 shows a block diagram illustrating a cell phone employing the image pickup device relating to an embodiment of the present invention.

FIG. 1 is a perspective view showing an image pickup device relating to an embodiment of the present invention, and FIG. 2 is a block diagram showing a cell phone equipped with the image pickup device.

As shown in FIG. 1, image pickup device 50 includes an image sensor as a solid-state image pickup element, and further includes substrate 52 for transmitting and receiving electric signal of the imaging sensor, external connection terminal 54 to be connected with substrate 52, and lens barrel 20 holding an image pickup lens. Substrate 52 includes supporting plate 52a and flexible substrate 52b. Supporting plate 52a supports the imaging sensor which will be described below. Flexible substrate 52b is connected to supporting plate 52a at one end and is connected to external connection terminal 54 at the other end. External connection terminal 54 outputs image signal such as luminance signal and color difference signal obtained based on light received by the imaging sensor through the image pickup lens to the side of control section 101 of cell phone 100 illustrated in FIG. 2.

As shown in FIG. 2, cell phone 100 is provided with: control section (CPU) 101 which centrally controls respective sections and executes programs corresponding to various types of processing; input section 60 for indicating and inputting information such as numbers with keys; display section 70 for displaying the predetermined data, and images and movies which has been picked up; and radio communication section 80 for realizing various kinds of information communication to an external server. Further, cell phone 100 includes storage section (ROM) 91 which stores system programs of the cell phone 100, various processing programs, and necessary data such as terminal ID; temporary storage section (RAM) 92 used as a working area which temporarily stores various processing programs and data to be processed by control section 101, processed data, and image data from the image pickup apparatus 50; and image pickup device 50. Display section 70 formed by a device such as a liquid display is disposed on the outer surface of cell phone 100, and image pickup device 50 is disposed on the opposite surface to display section 70.

Figure 3:
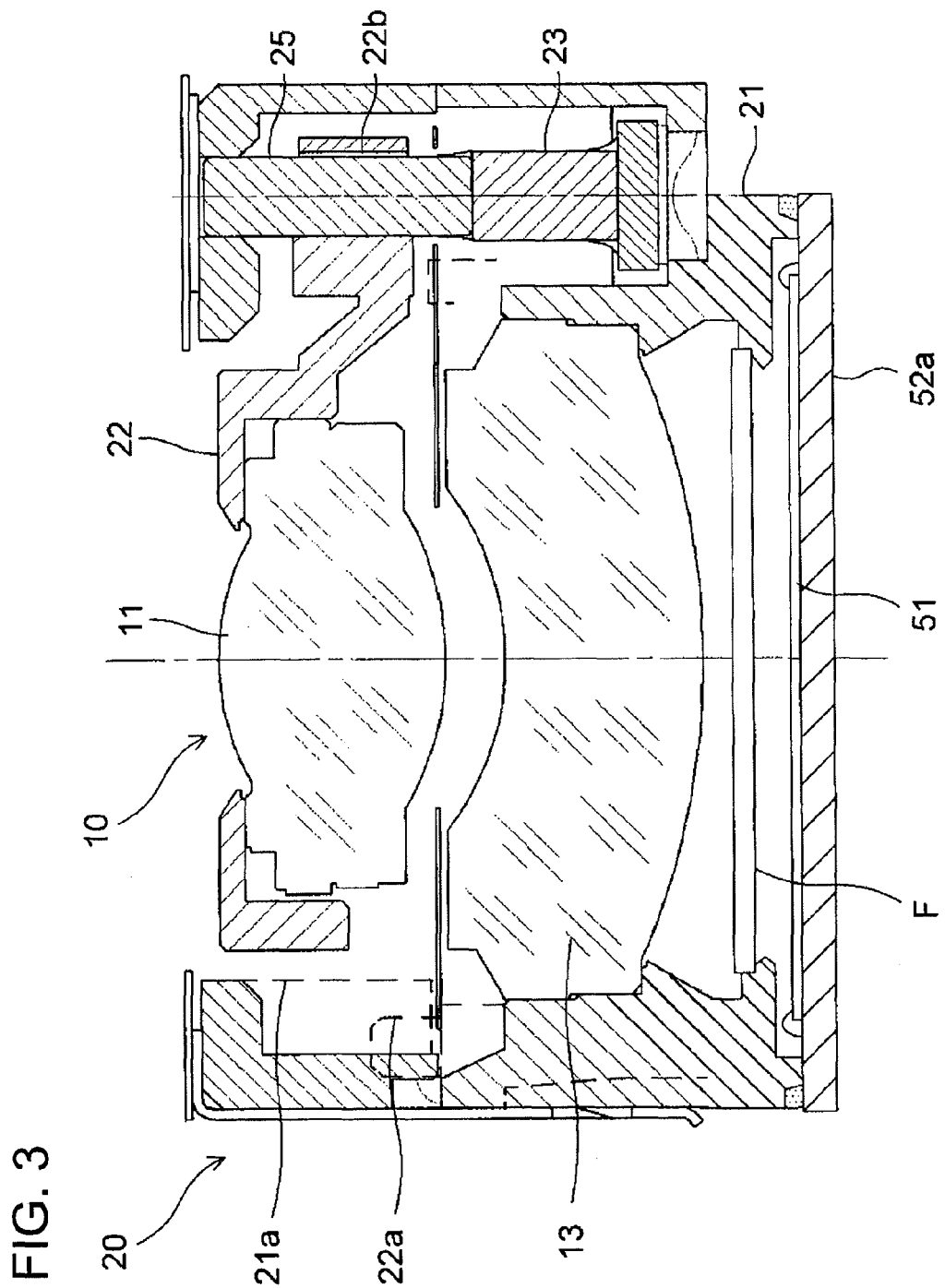
FIG. 3 shows a sectional view illustrating a lens barrel used in the image pickup device relating to a present embodiment of the present invention.

Next, a lens barrel for use in image pickup device 50 will be described by using FIG. 3. FIG. 3 is a sectional view illustrating lens barrel 20 and the upper side of FIG. 3 represents the subject side.

The lower end of lens barrel 20 is fixed on supporting plate 52a with adhesive, and lens barrel 20 and supporting plate 52a encloses imaging sensor 51 therein. Lens barrel 20 and supporting plate 52a shields the inner space from light, whereby, imaging sensor 51 receives only light entering from image pickup lens 10.

Imaging sensor 51 is structured by a CMOS-type imaging sensor as an image pickup element. Imaging sensor 51 includes a light-receiving section wherein pixels (photoelectric conversion elements) are arranged on a two-dimensional basis, and a signal processing circuit formed around the pixels. A CCD-type imaging sensor may be provided as imaging sensor 51. In imaging sensor 51, the light-receiving section photo-electrically converts subject light entering from image pickup lens 10, and the signal processing circuit carries out an A/D conversion for signal charges and converts them into image signal such as luminance signal and color difference signal. Imaging sensor 51 is connected with wires to plural information-transmitting pads arranged on a surface of supporting plate 52a so as to output the image signal to the control section of the cell phone.

Lens barrel 20 includes fixed barrel 21, focusing lens barrel 22 for holding plural lenses (focusing lens group) 11 at the side of the subject in image pickup lens 10 (the upper portion in FIG. 3), and piezoelectric element 23 forming an actuator.

Fixed barrel 21 holds a lens (stationary lens group) 13 at the side of imaging sensor 51 in image pickup lens 10, and further holds filter F such as IR-cut filter and optical low-pass filter at a position between stationary lens group 13 and imaging sensor 51. An IR-cut filter shields infrared light and transmits visible light. An IR-cut filter may be arranged in a package of imaging sensor 51 so as to be one body. An optical low-pass filter has a predetermined cut-off frequency characteristic which is determined by pixel pitch of the imaging sensor, and restricts a generation of color moiré in the imaging sensor. If color moiré is inconspicuous, an optical low-pass filter can be eliminated.

Fixed barrel 21 further includes straight guide groove 21a which extends in the optical axis direction. Straight guide groove 21a is arranged near focusing lens barrel 22 and is engaged with guide projection section 22a formed on focusing lens barrel 22 to guide focusing lens barrel 22 in the optical axis direction. Fixed barrel 21 further holds piezoelectric element 23 at the opposite end of the straight guide groove 21a across the optical axis.

Piezoelectric element 23 has a cylindrical shape. One end of piezoelectric element 23 is fixed and held on the end facing imaging sensor 51 of fixed barrel 21 with adhesive, and the other end of piezoelectric element 23 holds and is fixed to drive shaft 25 extending parallel with the optical axis with adhesive. Drive shaft 25 is fitted with slider hole 22b formed on focusing lens barrel 22 so that slider hole 22b can freely move in the optical axis direction. Piezoelectric device 23 is composed of piezoelectric ceramics layered in the optical axis direction and works as an actuator such that the piezoelectric device expands and contracts in the layering direction corresponding to a voltage impression. By the expansion and contraction of piezoelectric device 23, drive shaft 25 finely oscillates in the optical axis direction. The small oscillation of drive shaft 25 moves focusing lens barrel 22 in the optical axis direction through slider hole 22b. Thereby, focusing lens barrel 22 is guided by straight guide groove 21a and moves straightly in the optical axis direction, and image pickup lens 10 can focuses on a subject at a close position.

Generally, image pickup lens 10 for use in a cell phone includes a stop at a position close to the subject. Therefore, the effective aperture of a subject-side lenses (focusing lens group) 11 is extremely smaller than the effective aperture of lens (stationary lens group) 13 at the side of imaging sensor 51. When plural lenses 11 at the side of the subject are defined as focusing lenses and drive section such as drive shaft 25 and slider hole 22b and movement guide structure such as straight guide groove 21a and guide projection section 22a are arranged at the outer circumference side of focusing lens barrel 22 in order to move the focusing lenses, an image pickup apparatus is not enlarged.

Figure 4:
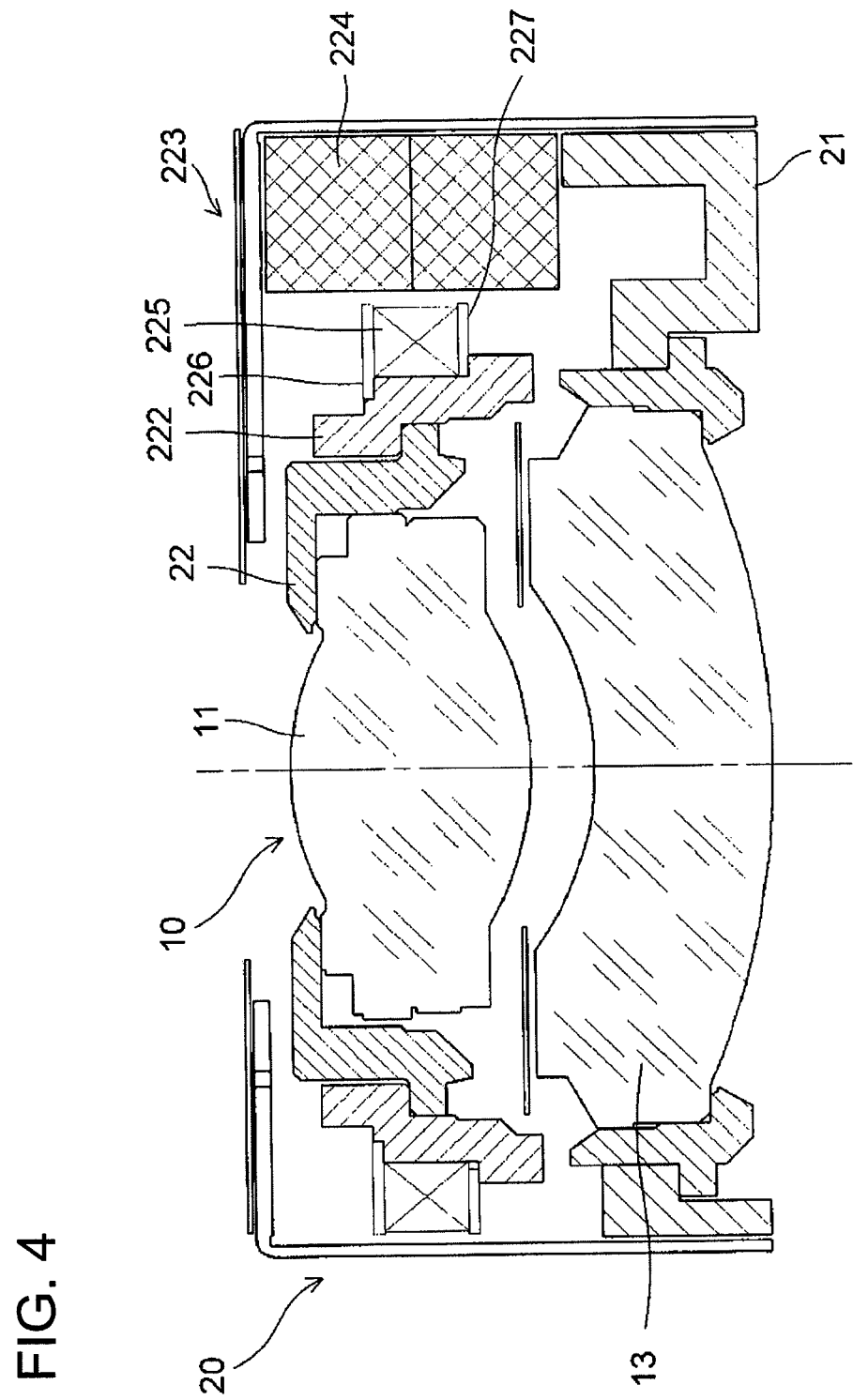
FIG. 4 shows a sectional view illustrating another lens barrel used in the image pickup device relating to a present embodiment of the present invention.

Next, another lens barrel will be described by using FIG. 4. FIG. 4 is a sectional view showing a lens barrel. In the figure, structures which are common with those of FIG. 3 are labeled with the same signs. An actuator which is different from that of the former embodiment will be described mainly. Imaging sensor 51, supporting plate 52a and filter F are the same as those of the former embodiment and those illustrations and descriptions will be omitted.

In the present embodiment, the actuator includes voice coil motor 223. Voice coil motor 223 is arranged at the outside of focusing lens barrel 22 in the radial direction. Voice coil motor 223 includes magnet 224 and coli 225. Magnet 224 is fixed on and held by fixed barrel 21 through a yoke which is not illustrated. Coil 225 is attached on the outer circumference of movable barrel 222 to face magnet 224. Movable barrel 222 is fixed on the outer circumference of focusing lens barrel 22. Spring members 226 and 227 are arranged on the both of the upward and downward ends of coil 225.

Each of spring members 226 and 227 is composed of a circular plate with a hollow and provides biasing force such that the spring member can be bent freely in the optical axis direction. The outer circumference end of spring member 226 is fixed on the yoke which is not illustrated, and the inner circumference end of spring member 226 is in contact with the upper flange surface of movable barrel 222. The outer circumference end of spring member 227 is fixed on the yoke which is not illustrated, and the inner circumference end of spring member 227 is in contact with the lower flange surface of movable barrel 222. Therefore, coil 225 is sandwiched by spring members 226 and 227.

When an electric current passes through coil 225 in a predetermined direction under the above condition, electromagnetic force is generated between coil 225 and magnet 224. Coil 225 moves in the optical axis direction due to the electromagnetic force against the biasing force of spring members 226 and 227. Movable barrel 222 and focusing lens barrel 22 moves in the optical axis direction together with coil 225, and image pickup lens 10 can focus on a subject located at a close position. When the electric current to coil 225 stops, the electromagnetic force is removed, movable barrel 222 returns to the original position by the biasing force of spring members 226 and 227 and image pickup lens 10 is reset to a position of image pickup at an infinite distance.

Similarly to the embodiment of FIG. 3, the effective aperture of the subject-side lenses (focusing lens group) 11 is extremely smaller than the effective aperture of the imaging-sensor-side lens (stationary lens group) 13, in the present embodiment. When plural lenses 11 located at the subject side is defined as focusing lenses and a drive mechanism such as voice coil motor 223 is arranged at the outer circumference side of focusing lens barrel 22 in order to move the focusing lenses, the image pickup device is not enlarged.

Figure 5:
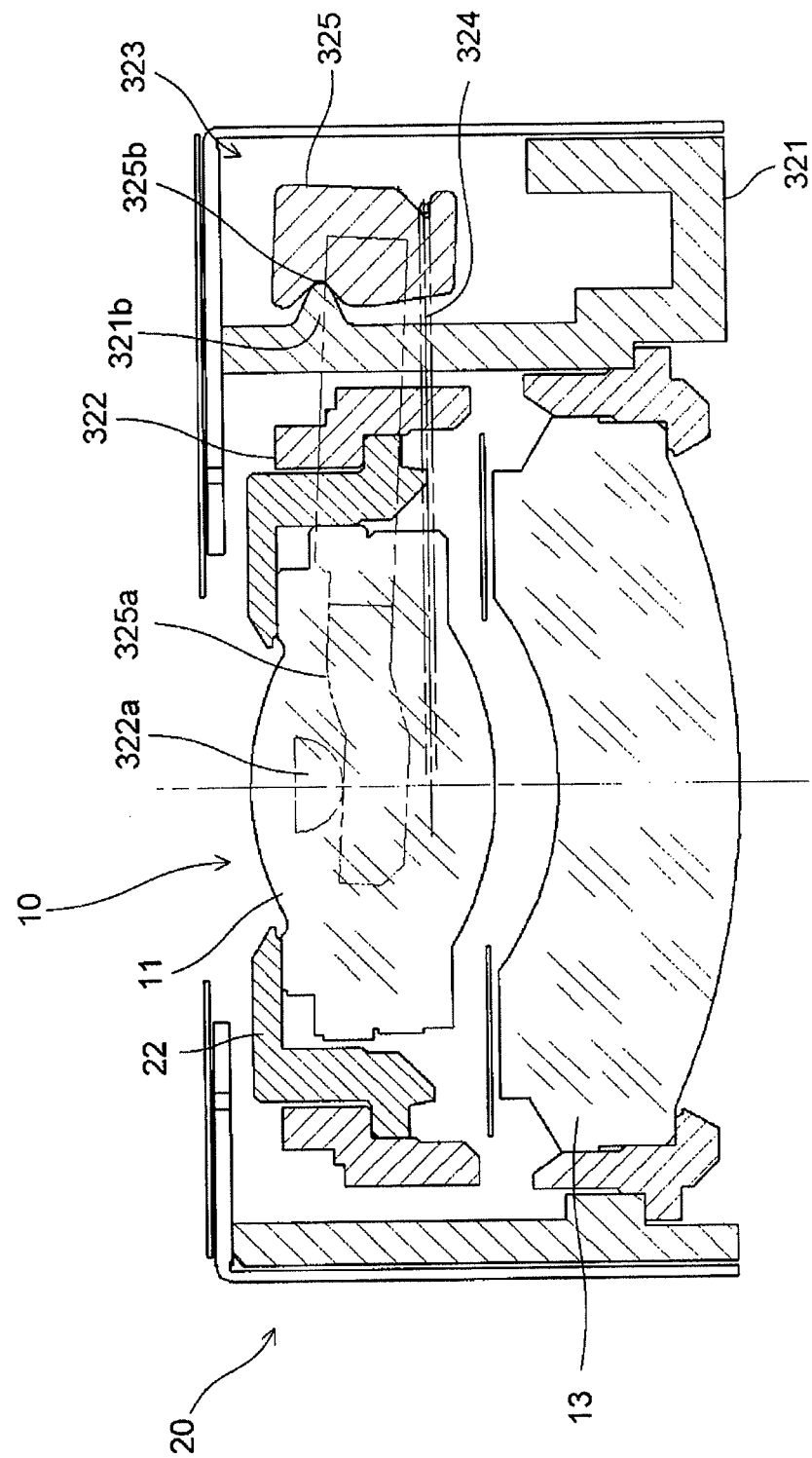
FIG. 5 shows a sectional view illustrating another lens barrel used in the image pickup device relating to a present embodiment of the present invention.

Next, another lens barrel will be described by using FIG. 5. FIG. 5 is a sectional view showing a lens barrel. In the figure, structures which are common with those of FIG. 3 are labeled with the same signs. An actuator which is different from that of the former embodiment will be described mainly. Imaging sensor 51, supporting plate 52a and filter F are the same as those of the formed embodiment and those illustrations and descriptions will be omitted.

In the present embodiment, SMA (Shape memory alloy) motor 323 is used for the actuator. SMA motor 323 includes SMA wire 324 formed of shape memory alloy. Shape memory alloy is an alloy which is deformed arbitrarily when electricity is supplied from the outside. SMA wire 324 formed of shape memory alloy is deformed so as to expand and contract in the direction of the line-shaped member by supplying electricity.

One end of SMA wire 324 is fixed to fixed barrel 321 and the other end is fixed to drive member 325.

Drive member 325 is formed of resin in a semicircle and belt shape, and SMA wire 324 is extended along a V-shaped groove on the outer circumference side of the drive member. On inner circumference side of the drive member 325, support section 325b having a V-shape and extending along the circumference direction is formed. Support section 325b is rotatably engaged with support receiving section 321b having a convex shape and formed on fixed barrel 321. When electricity is supplied to SMA wire 324, SMA wire 324 is deformed in the expansion and contraction direction. Corresponding to the deformation of SMA wire in the expansion and contraction direction, drive member 325 is guided by support receiving section 321b and rotates in one direction. When SMA wire 324 is returning to its original shape (the condition of expansion) by stop of supplying electricity, drive member 325 inversely rotates by biasing force of a spring which is not illustrated, and returns to the initial position.

Further, drive member 325 includes cam section 325a (shown by a two dot chain line in FIG. 5) extending in the circumference direction. Cam section 325a includes an inclined surface which inclines from the direction perpendicular to the optical axis, and is always in contact with cam follower 322a of movable barrel 322. Movable barrel 322 is pressed to the imaging-sensor side (the lower side of FIG. 5) with an unillustrated pressing member such as a spring, so that cam follower 322a is always in contact with cam section 325a. When drive member 325 rotates in one direction, cam follower 322a goes up onto the inclined surface of cam member 325a and movable barrel 322 moves to the subject side (the upper side of FIG. 5) in the optical axis direction. Thereby, focusing lens barrel 22 moves together with movable barrel 322 and image pickup lens 10 can focus on the subject at a close position.

Similarly to the embodiment of FIG. 3, the effective aperture of the subject-side lenses (focusing lens group) 11 is extremely smaller than the effective aperture of the imaging-sensor-side lens (stationary lens group) 13, in the present embodiment. When plural lenses 11 located at the subject side is defined as focusing lenses and a drive mechanism such as SMA motor 323 is arranged at the outer circumference side of focusing lens barrel 22 in order to move the focusing lenses, the image pickup device is not enlarged.

Next, a structure of the image pickup lens held by the above lens barrel 20 will be described based on FIGS. 6 to 12. FIGS. 6 to 12 are sectional views of image pickup lenses at an infinite distance relating to the first to seventh embodiments. In FIGS. 6 to 12, a movement of the focusing lens group coming from a focusing operation from the infinite distance to a close distance is represented by an arrow.

First Embodiment

Figure 6:
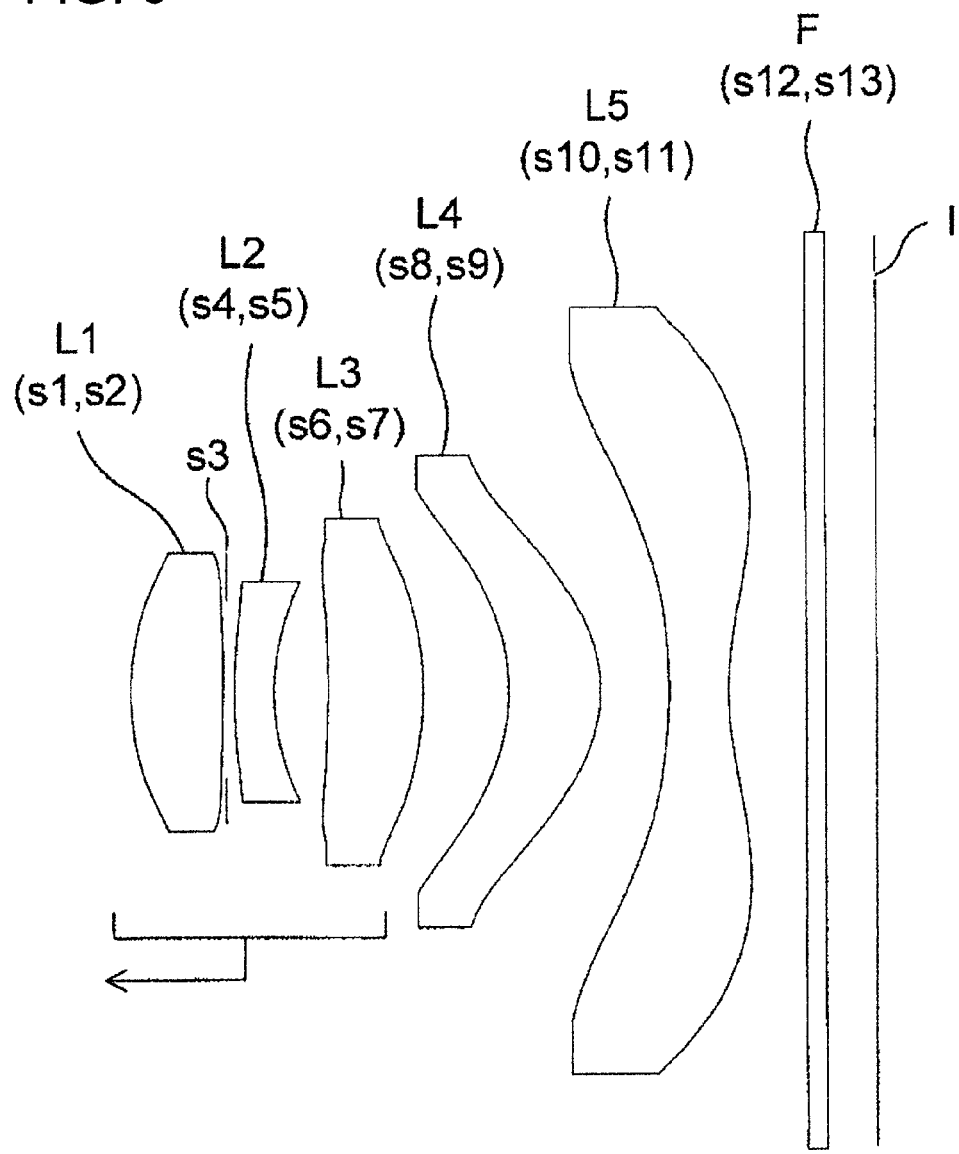
FIG. 6 shows a sectional view of the image pickup lens of the first embodiment for use in the image pickup device of the present invention.

As shown in FIG. 6, the image pickup lens includes, in order from the subject: first lens L1 in biconcave shape; aperture stop s3; second lens L2 with negative power in meniscus shape whose concave surface faces the image side; third lens L3 with positive power in meniscus shape whose convex surface faces the image side; fourth lens L4 with positive power in meniscus shape whose convex surface faces the image side; and fifth lens L5 in biconcave shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. First to third lenses L1-L3 form a focusing lens group and move to the subject side together as one body when an image is picked up at a close distance. Herein, F represents a filter such as an optical low-pass filter and IR-cut filter, and I represents an image plane on the image pickup element. Herein, power is an amount determined by a reciprocal of a focal length.

Second Embodiment

Figure 7:
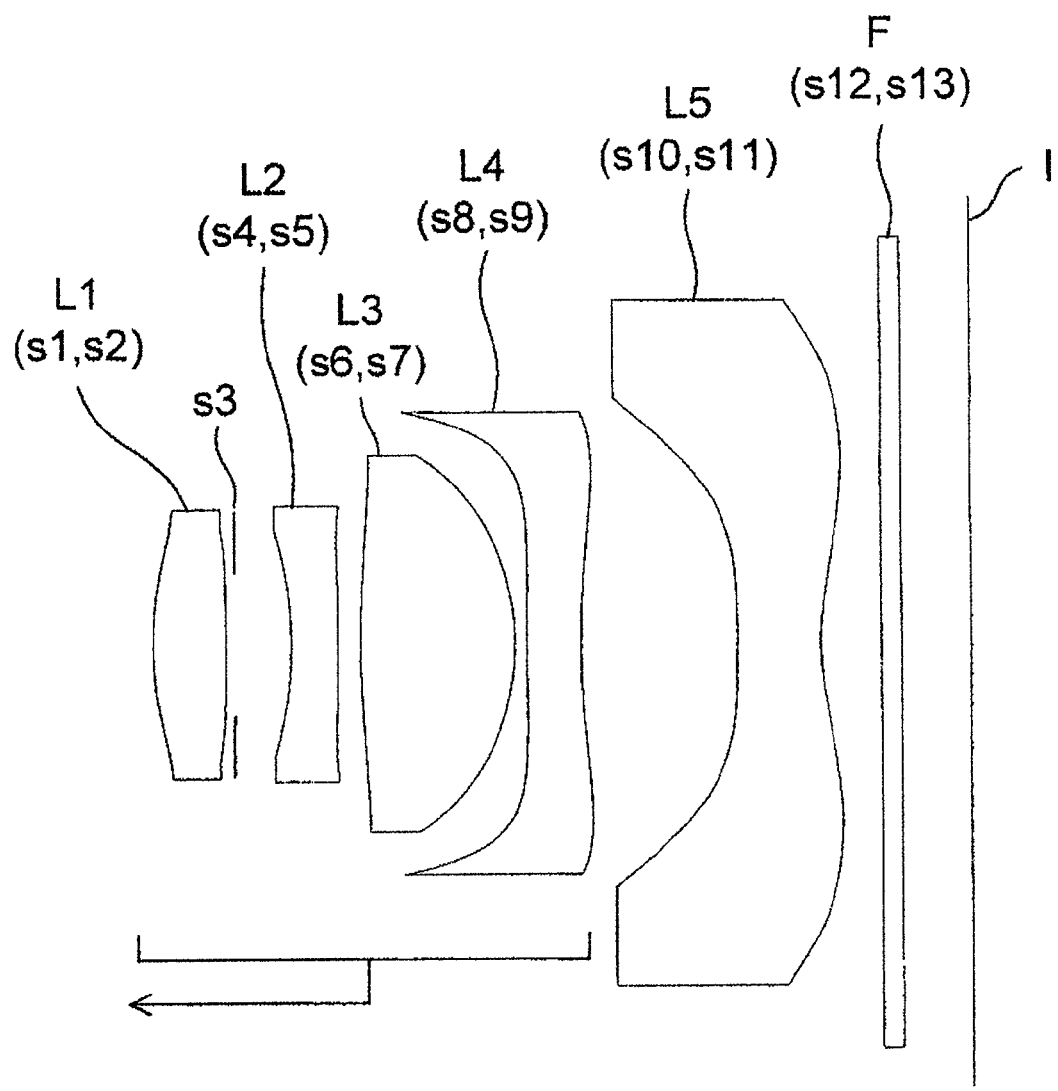
FIG. 7 shows a sectional view of the image pickup lens of the second embodiment for use in the image pickup device of the present invention.

As shown in FIG. 7, the image pickup lens includes, in order from the subject: first lens L1 with positive power, including a convex surface facing the subject; aperture stop s3; second lens L2 with negative power, including a concave surface facing the subject side; third lens L3 in biconvex shape; fourth lens L4 with negative power in meniscus shape whose concave surface faces the image side; and fifth lens L5 in biconcave shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. As for forth lens L4 and fifth lens L5, when they have weak power and aspheric surfaces, they can be formed to have positive power. First to fourth lenses L1-L4 form a focusing lens group and move to the subject side together as one body when an image is picked up at a close distance. Herein, F represents a filter such as an optical low-pass filter and IR-cut filter, and I represents an image plane on the image pickup element.

Third Embodiment

Figure 8:
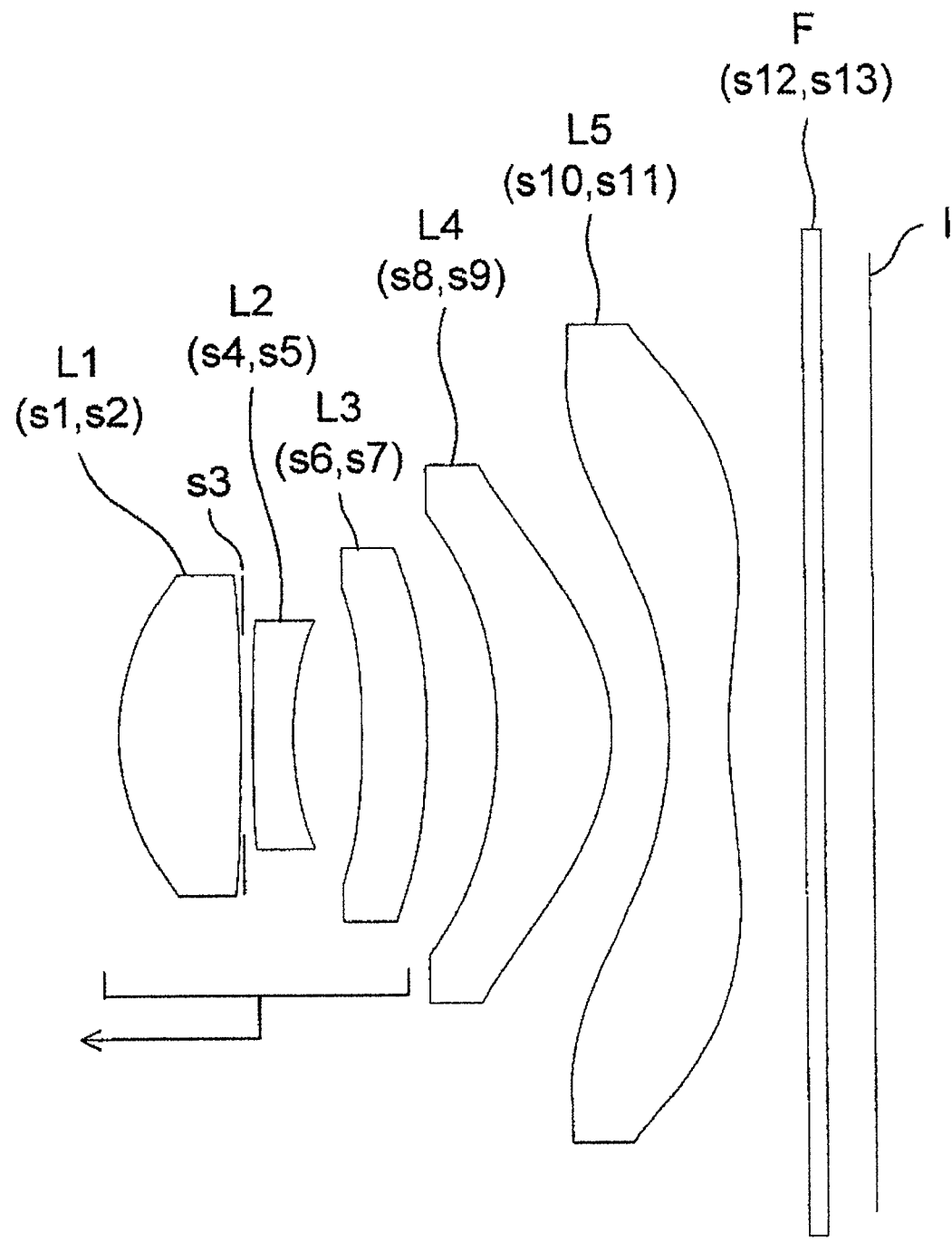
FIG. 8 shows a sectional view of the image pickup lens of the third embodiment for use in the image pickup device of the present invention.

As shown in FIG. 8, the image pickup lens includes, in order from the subject first lens L1 in biconvex shape; aperture stop s3; second lens L2 with negative power in a meniscus shape whose concave surface faces the image side; third lens L3 with positive power in a meniscus shape whose convex surface faces the image side; fourth lens L4 with positive power in meniscus shape whose convex surface faces the image side; and fifth lens L5 in biconcave shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. As for third lens L3, when it has relatively weak power and an aspheric surface, it can be formed to have negative power. First to third lenses L1-L3 form a focusing lens group and move to the subject side together as one body when an image is picked up at a close distance. Herein, F represents a filter such as an optical low-pass filter and IR-cut filter, and I represents the image plane on the image pickup element.

Fourth Embodiment

Figure 9:
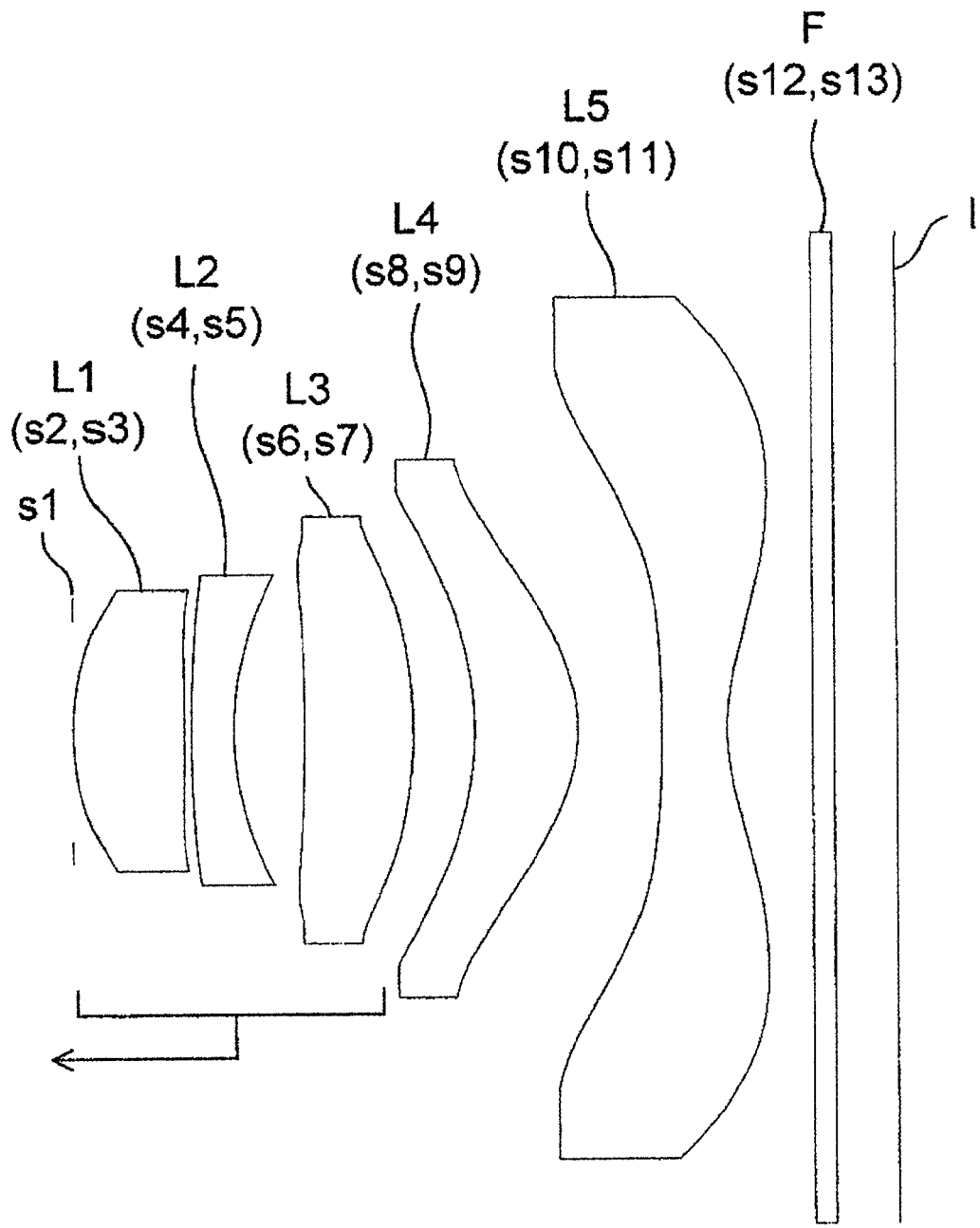
FIG. 9 shows a sectional view of the image pickup lens of the fourth embodiment for use in the image pickup device of the present invention.

As shown in FIG. 9, the image pickup lens includes, in order from the subject: aperture stop s1; first lens L1 in biconvex shape; second lens L2 with negative power in a meniscus shape whose concave surface faces the image side; third lens L3 with positive power in a meniscus shape whose convex surface faces the image side; fourth lens L4 with positive power in meniscus shape whose convex surface faces the image side; and fifth lens L5 in biconcave shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. First to third lenses L1-L3 form a focusing lens group and move to the subject side together as one body when an image is picked up at a close distance. Herein, F represents a filter such as an optical low-pass filter and IR-cut filter, and I represents the image plane on the image pickup element.

Fifth Embodiment

Figure 10:
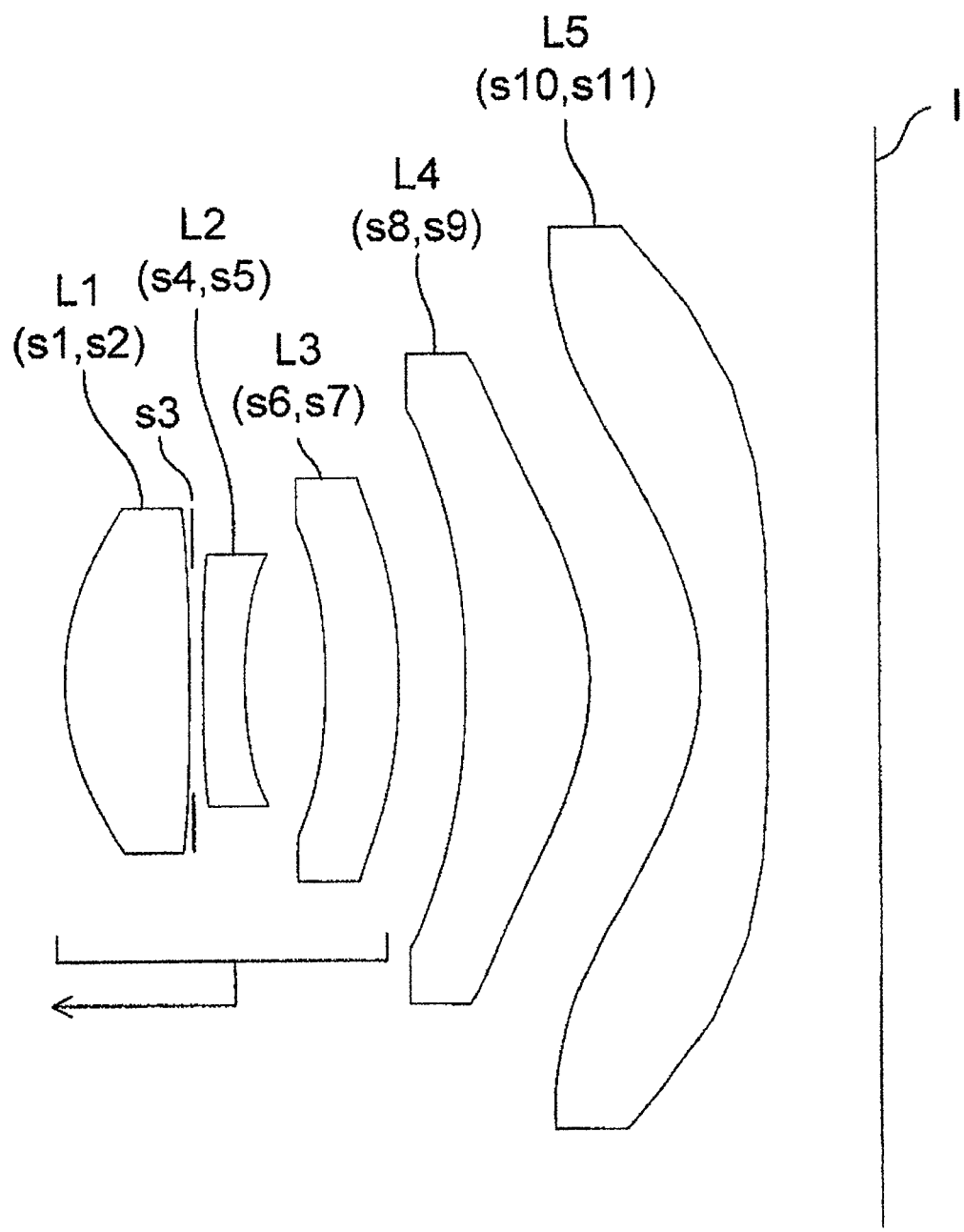
FIG. 10 shows a sectional view of the image pickup lens of the fifth embodiment for use in the image pickup device of the present invention.

As shown in FIG. 10, the image pickup lens includes, in order from the subject: first lens L1 in biconvex shape; aperture stop s3; second lens L2 with negative power in a meniscus shape whose concave surface faces the image side; third lens L3 with positive power in a meniscus shape whose convex surface faces the image side; fourth lens L4 with positive power in meniscus shape whose convex surface faces the image side; and fifth lens L5 in biconvex shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. As for third lens L3, when it has relatively weak power and an aspheric surface, it can be formed to have negative power. First to third lenses L1-L3 form a focusing lens group and move to the subject side together as one body when an image is picked up at a close distance. Herein, I represents the image plane on the image pickup element. The embodiment does not employ filter F.

Sixth Embodiment

Figure 11:
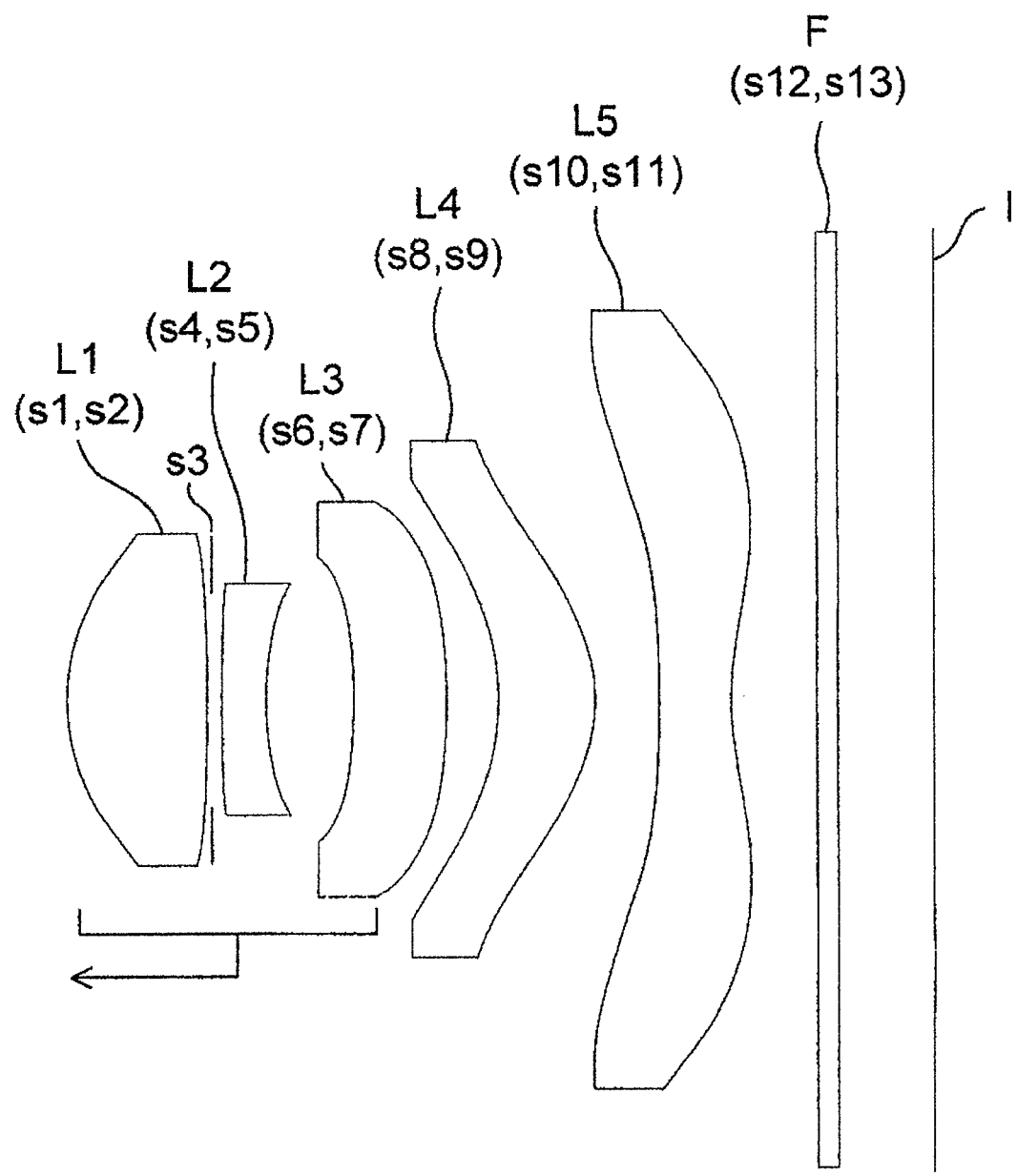
FIG. 11 shows a sectional view of the image pickup lens of the sixth embodiment for use in the image pickup device of the present invention.

As shown in FIG. 11, the image pickup lens includes, in order from the subject: first lens L1 in biconvex shape; aperture stop s3; second lens L2 with negative power in a meniscus shape whose concave surface faces the image side; third lens L3 with positive power in a meniscus shape whose convex surface faces the image side; fourth lens L4 with positive power in meniscus shape whose convex surface faces the image side; and fifth lens L5 in biconvex shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. First to third lenses L1-L3 form a focusing lens group and move to the subject side together as one body when an image is picked up at a close distance. Herein, F represents a filter such as an optical low-pass filter and IR-cut filter, and I represents the image plane on the image pickup element.

Seventh Embodiment

Figure 12:
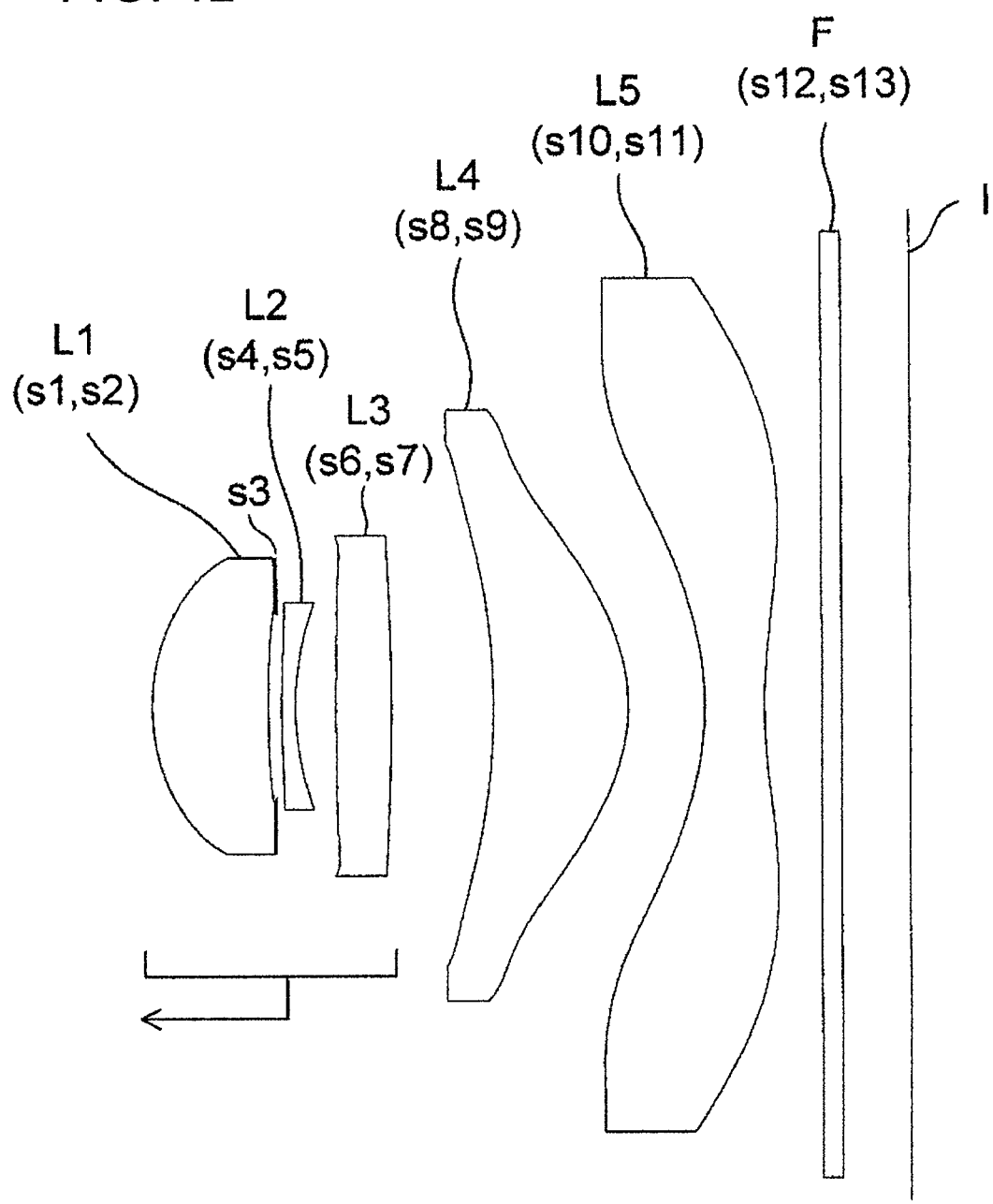
FIG. 12 shows a sectional view of the image pickup lens of the seventh embodiment for use in the image pickup device of the present invention.
Figure 13A:
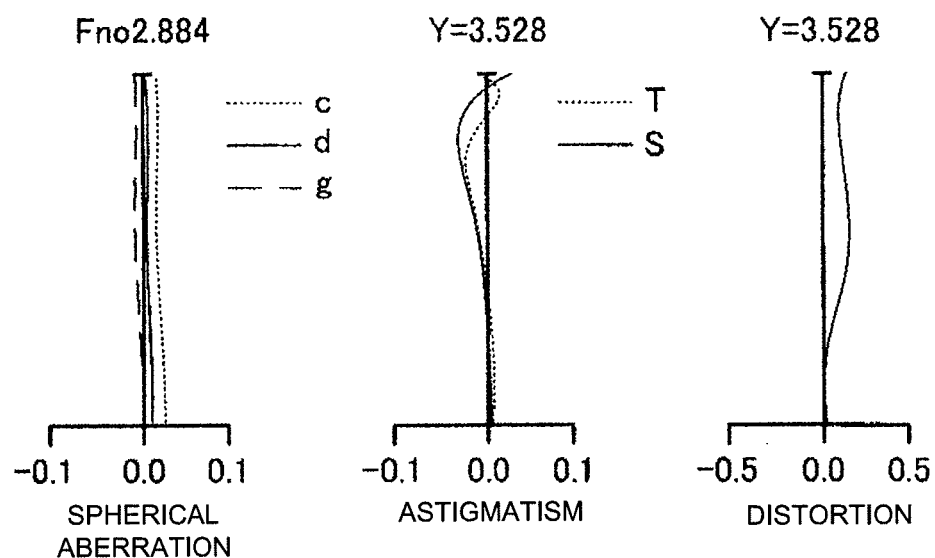
FIGS. 13a and 13b show aberration diagrams of the image pickup lens relating to the first embodiment of the present invention.
Figure 13B:
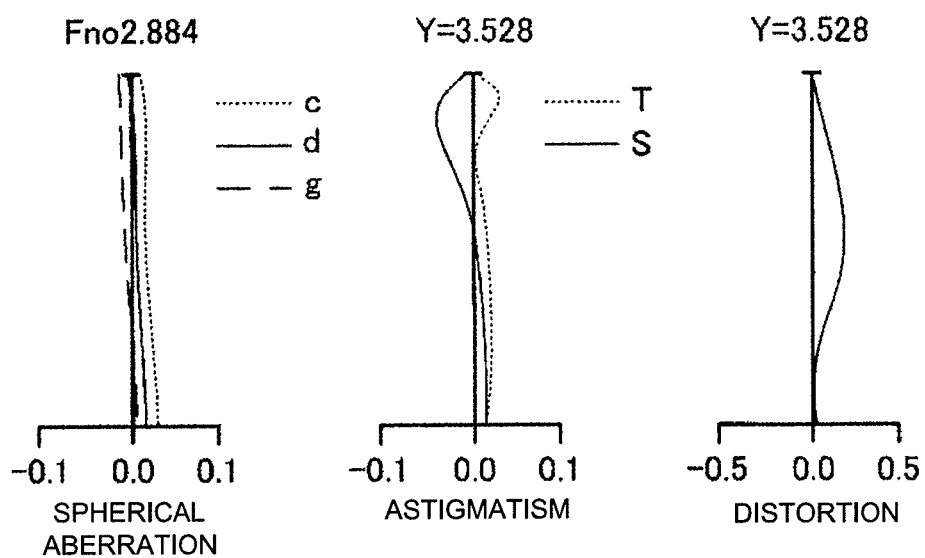
Figure 14A:
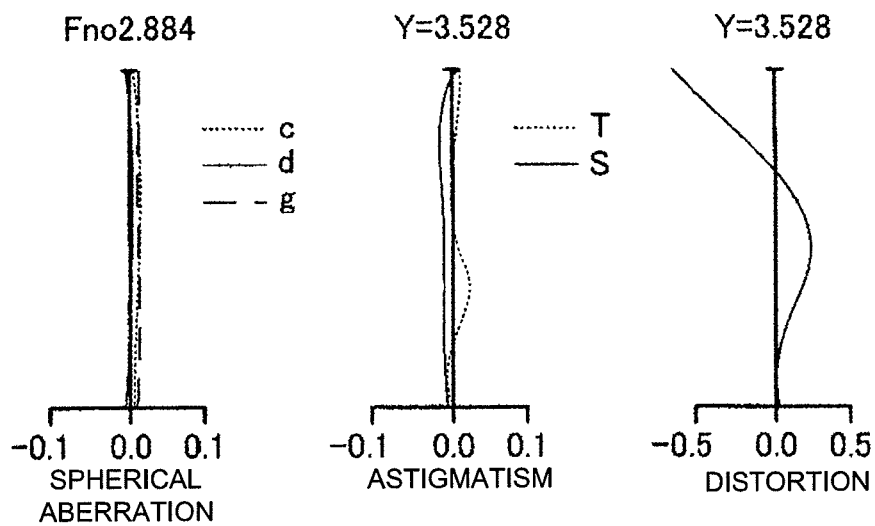
FIGS. 14a and 14b aberration diagrams of the image pickup lens relating to the second embodiment of the present invention.
Figure 14B:
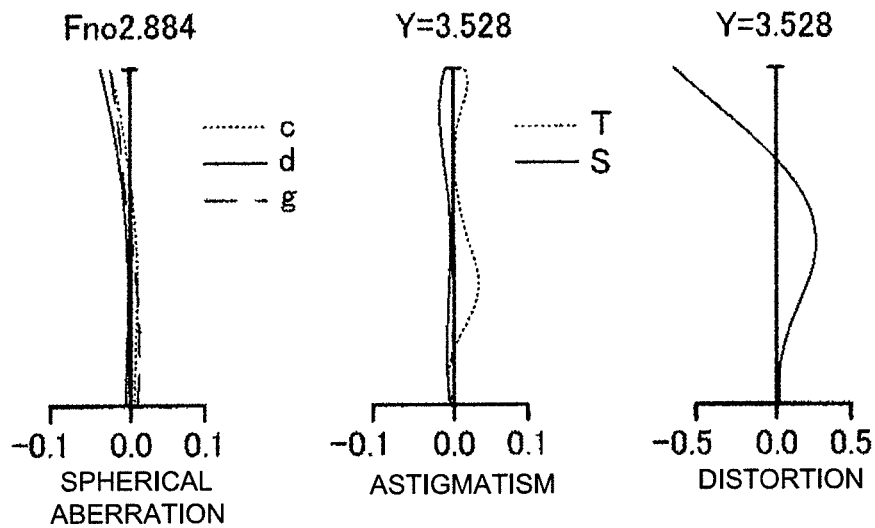
Figure 15A:
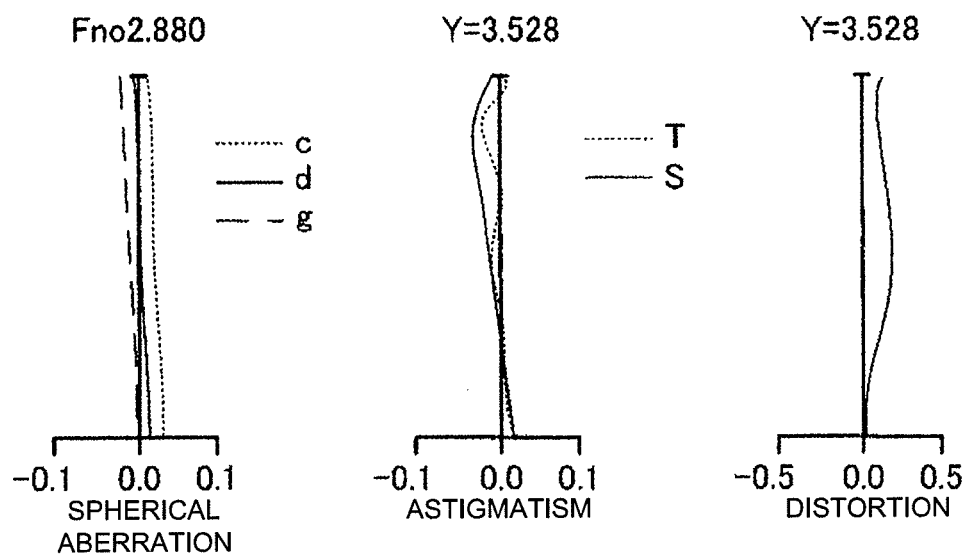
FIGS. 15a and 15b aberration diagrams of the image pickup lens relating to the third embodiment of the present invention.
Figure 15B:
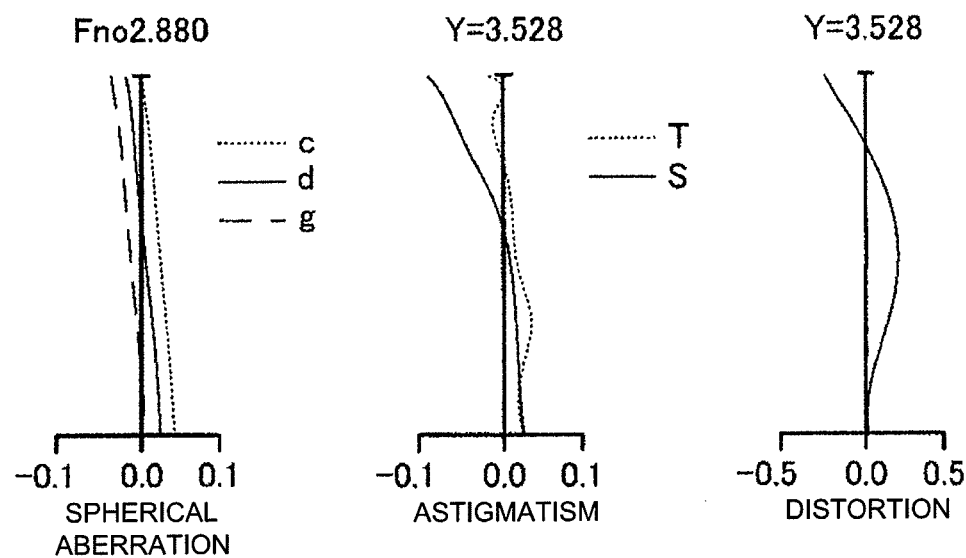
Figure 16A:
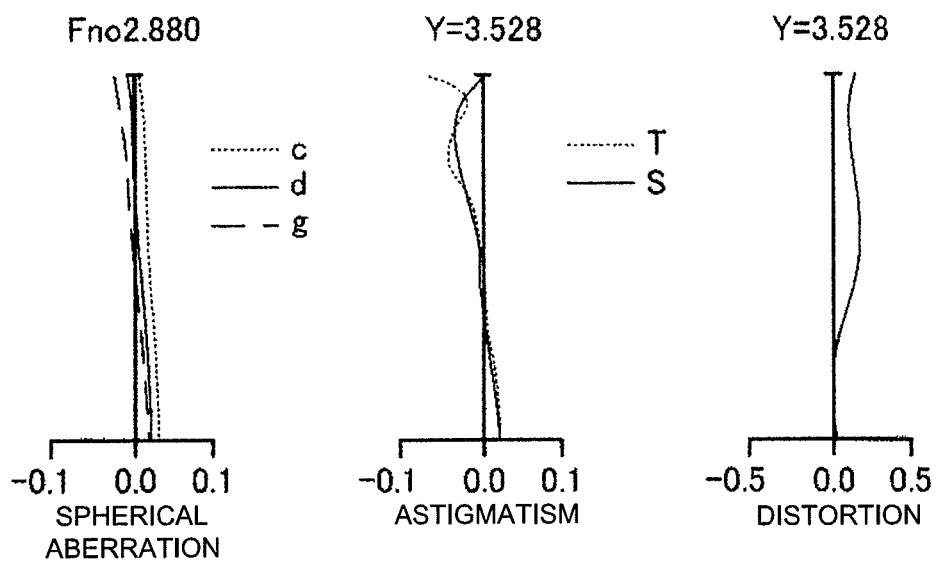
FIGS. 16a and 16b show aberration diagrams of the image pickup lens relating to the fourth embodiment of the present invention.
Figure 16B:
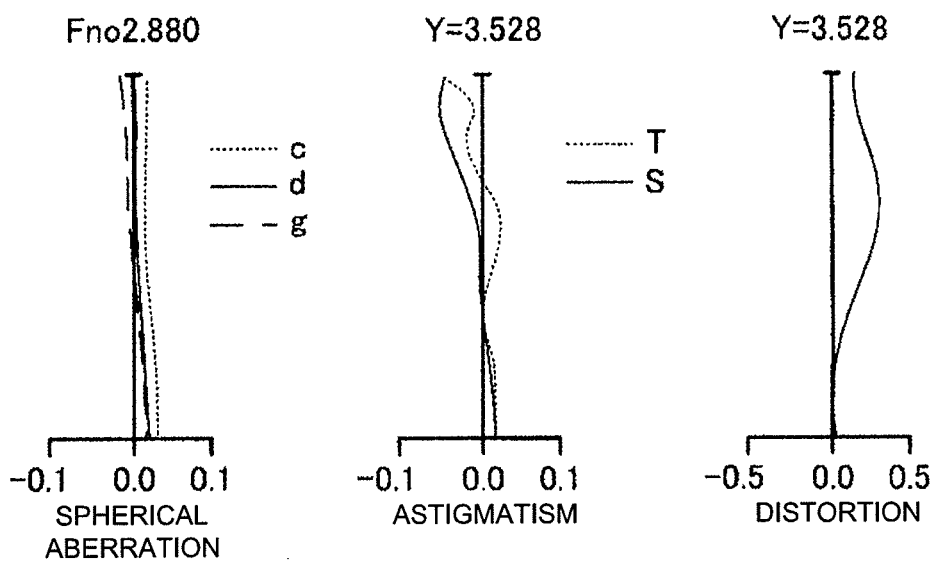
Figure 17A:
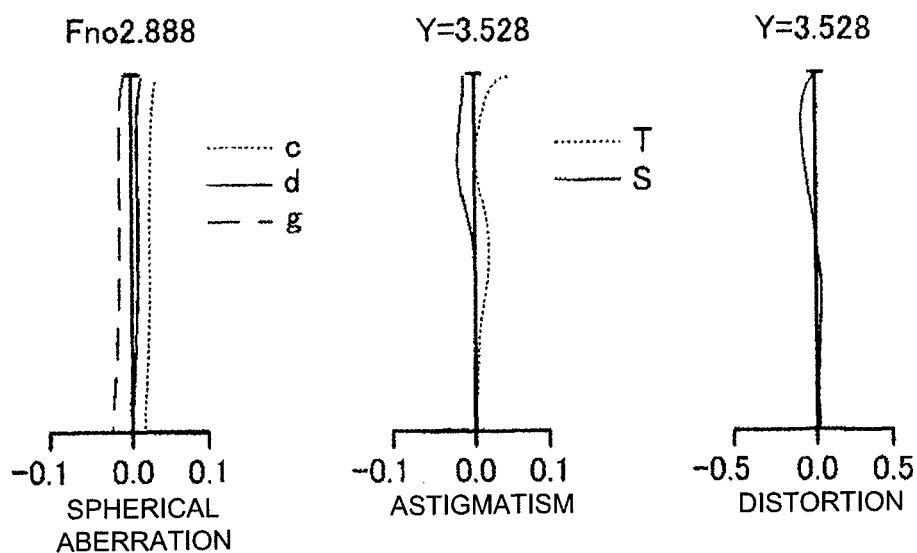
FIGS. 17a and 17b show aberration diagrams of the image pickup lens relating to the fifth embodiment of the present invention.
Figure 17B:
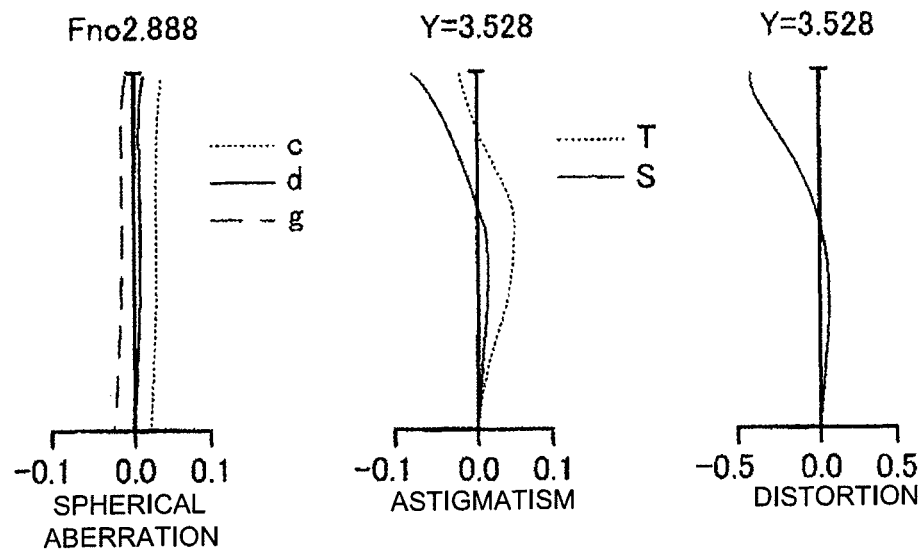
Figure 18A:
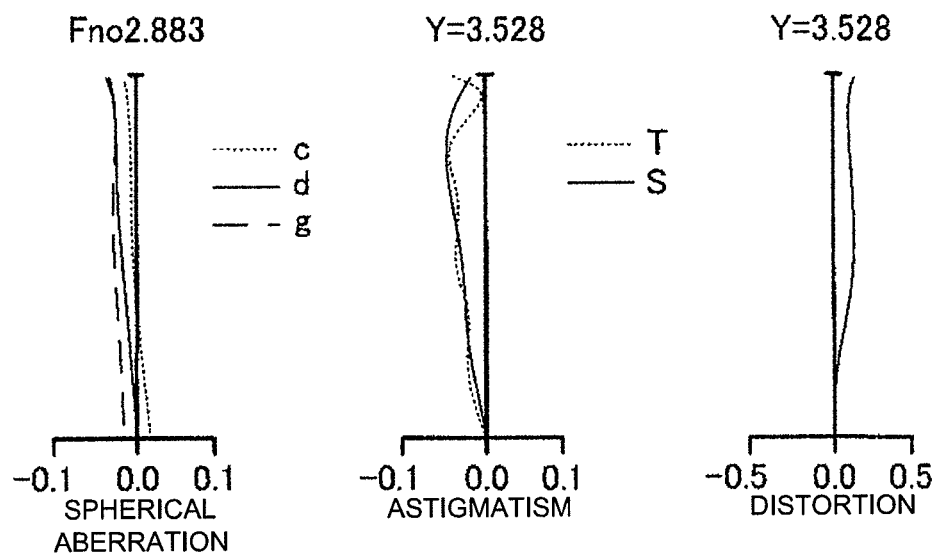
FIGS. 18a and 18b show aberration diagrams of the image pickup lens relating to the sixth embodiment of the present invention.
Figure 18B:
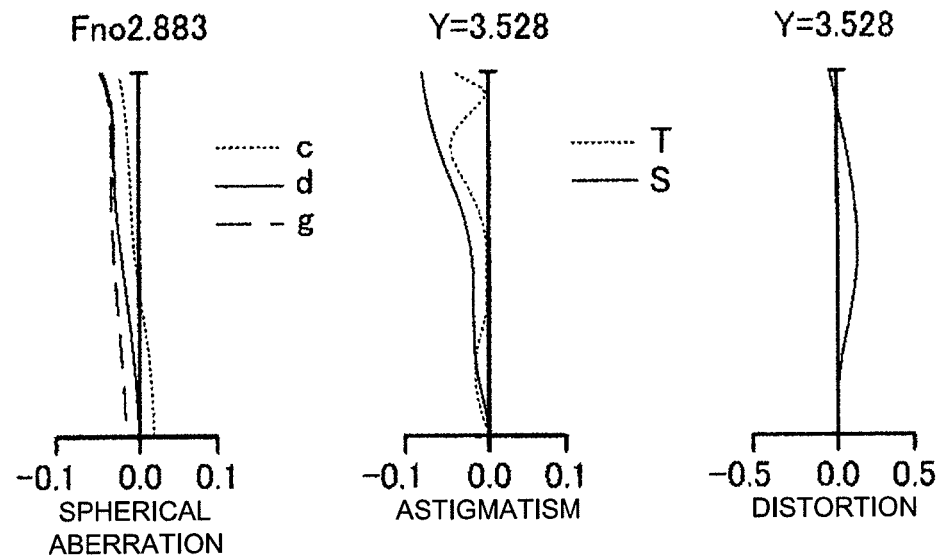
Figure 19A:
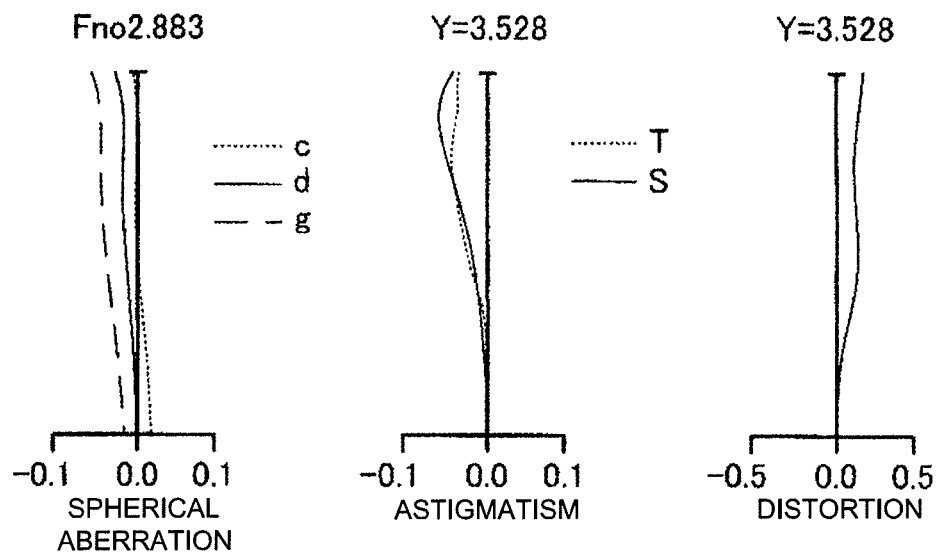
FIGS. 19a and 19b show aberration diagrams of the image pickup lens relating to the seventh embodiment of the present invention.
Figure 19B:
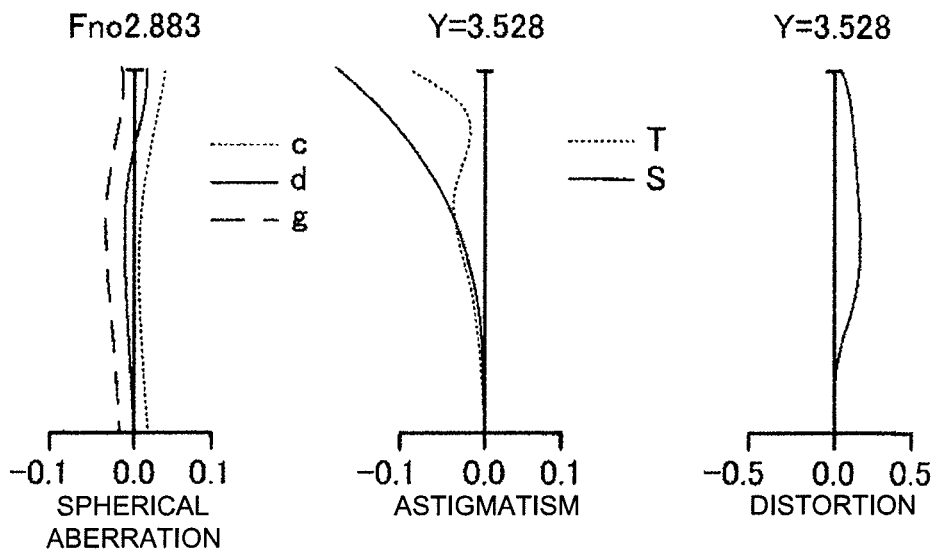

As shown in FIG. 12, the image pickup lens includes, in order from the subject: first lens L1 with positive power in a meniscus shape whose convex surface faces the subject side; aperture stop s3; second lens L2 with negative power in a meniscus shape whose concave surface faces the image side; third lens L3 in a biconvex shape; fourth lens L4 with positive power in meniscus shape whose convex surface faces the image side; and fifth lens L5 in biconcave shape. Each surface of first to fifth lenses L1-L5 has aspheric shape. Especially, an aspheric surface at the image side of fifth lens L5 includes an inflection point at a position excluding the intersection of the optical axis and the aspheric surface. The aspheric surface at the image side of fifth lens L5 has a concaved shape in a paraxial area and has a convex shape in the lens periphery. First to third lenses L1-L3 form a focusing lens group and move to the subject side together as one body when an image is picked up at a close distance. Herein, F represents a filter such as an optical low-pass filter, IR-cut filter, and I represents the image plane on the image pickup element.

Each of the image pickup lenses of the above embodiments includes, in order from the subject, first lens L1 with positive power, comprising a convex surface facing the subject; second lens L2 with negative power, third lens L3 with positive or negative power; fourth lens L4 with positive or negative power; and fifth lens L5 comprising one surface in an aspheric shape including an inflection point at a position excluding an intersection of the one surface and the optical axis.

Such the structure enables downsizing. Further, by forming the fifth lens into an aspheric shape including an inflection point at the lens periphery, various aberrations at the periphery of the image area are corrected in excellent conditions and telecentricity of light fluxes entering the image plane is secured. Thereby, even in an image pickup lens composed of five lenses, the size becomes small and shading is controlled.

Further, each of the first and third to seventh embodiments includes, in order from the subject: first lens L1 with positive power, comprising a convex surface facing the subject; second lens L2 with negative power, comprising a concave surface facing the image; third lens L3 with positive or negative power; fourth lens L4 with positive power, comprising a convex surface facing the image; and fifth lens L5 with negative power, comprising a concave surface facing the image, wherein the first to third lenses L1-L3 moves toward the subject together as one body when an image is picked up at a close distance.

In such the structure, since the first to fourth lenses L1-L4 form positive composed power and fifth lens L5 is arranged as negative power, to form a telephoto type lens structure, the total length of the image pickup apparatus is reduced. Further, since the two negative lenses are arranged therein, the number of surfaces having light-divergent functions is increased, Petzval's sum is corrected, and excellent image-forming function can be secured up to the periphery of the image area.

Further, since the first to third lenses L1-L3 moves together in a focusing operation, excellent optical properties obtained when an image is picked up at a close distance can be secured. Since the focusing lens group is composed of three lenses, the power of the focusing lens group is enlarged the movement amount of the lenses for image pickup at a close distance can be reduced. The decreased movement amount of the lenses for image pickup at a close distance makes the total length of the image pickup lens short, forms a space where lens drive mechanism is arranged at the outer circumference side of the focusing lens group, makes the image pickup lens small in the radius direction and makes an image pickup device on which the image pickup lens is mounted small in size.

As described above, even when the power of the focusing lens group becomes strong, forming the focusing lens group with three lenses enables to arrange the respective lenses of the focusing lens group so as to cancel their decentration sensitivities each other. Therefore, the decentration sensitivity of the total focusing lens group can be reduced. When the decantation sensitivity is reduced, deterioration of optical properties caused when lenses and structural components are manufactured and lenses and structural components are assembled, can be controlled.

The image pickup lens of the second embodiment includes, in order from the subject first lens L1 with positive power, comprising a convex surface facing the subject; second lens L2 with negative power, comprising a concave surface facing the subject; third lens L3 with positive power; fourth lens L4 with positive or negative power, and fifth lens L5 with positive or negative power, wherein first to fourth lenses L1-L4 moves toward the subject together when an image is picked up at a close distance.

Such the structure makes the power strong by providing positive power with the first lens L1 and third lens L3, and enables to make the movement amount of lenses for image pickup at a close distance small. The small movement amount of lenses for image pickup at a close distance makes the total length of the image pickup short, forms a space on which a lens drive mechanism is arranged at the outer circumference side of the focusing lens group, makes the image pickup lens small in the radius size and makes an image pickup device on which the image pickup lens is mounted small in size.

As described above, even when the power of the focusing lens group becomes strong, providing the focusing lens group composed of four lenses enables to arrange the respective lenses of the focusing lens group so as to cancel their decentration sensitivities each other and to makes the decentration sensitivity of the focusing lens group small. When the decantation sensitivity becomes small, deterioration of optical properties caused when lenses and structural components are manufactured and lenses and structural components are assembled can be controlled.

Generally, when the positive power of first lens L1 is controlled to be small, an off-axis light enters second lens L2 at a large inclination angle. However, the above structure provides second lens L2 whose subject-side surface is a concave surface, which reduces the angle formed between an upper ray of off-axis light and a normal line of the lens surface and controls a generation of off-axis aberrations. Thereby, the light amount at the periphery can be secured.

Generally, since rays are converged around the image plan; the area of dust adhering to around the image plane becomes relatively large in comparison with an area of the converged light flux, which easily causes poor imaging coming from the dust. Therefore, corresponding to the trend of increasing the number of pixels, the size of the area where dust is permitted to adhere to around the image plane is being restricted. Further, measured for dust introduces an extremely enlarged cost, for example, because of preparing a high-quality clean room and addition of a dust removing process.

As above embodiments, when the lens closest to the image in the image pickup lens is stationarily disposed, the space around the image plane can be tightly enclosed, and dust adhering to an area around the image plane can be largely reduced. Even when dust enters into the image pickup lens, it adheres on the subject-side surface of the stationary lenses including the lens closest to the image. Because the dust exists apart from the image plane, there is no possibility that the dust deteriorates the optical properties. Further, the lens closest to the image has the largest outer diameter in the image pickup lens, in view of an incident angle to the image pickup lens. However, in the present embodiment, there is no need to move this lens in a focusing operation and there is no need to arrange a lens drive mechanism at the outer circumference side of the lens with larger outer diameter, which makes the image pickup device small in the radius direction. Further, when the lens at the image side is stationary disposed, a load of a motor of the lens drive mechanism can be reduced.

In the present embodiment, the image pickup lens is composed of at least five lenses, which reduces the decentration sensitivity of the focusing lens group, enables to control the deterioration of optical properties coming from the decetration sensitivity, and secures excellent optical properties obtained when images are picked up at a close distance and an infinite distance.

In the present embodiments, the following relationship is satisfied where Y is the maximum image height on the image plane of the image pickup element, and TL is a distance on the optical axis from the surface vertex of the lens closest to the subject to the image plane:

$$0.4 < Y/TL < 0.8 \quad (1).$$

When the value of the expression (1) exceeds the upper limit, fluctuation of optical properties caused when image pick up is performed from an infinite distance to a close distance is hardly controlled. Further, it makes reduction of decentration sensitivity difficult, and deterioration of optical properties coming from manufacturing errors of lenses and structural components and assembling errors of lenses and structural components becomes significant. On the other hand, when the value of the expression (1) is less than the lower limit, the power of the focusing lens group becomes weak, which enlarges the movement amount of the focusing lens group for image pickup at a close distance and makes decrease of the total length of the image pickup lens difficult. When the value is within the expression (1), the fluctuation of optical properties caused when image pick up is performed from an infinite distance to a close distance is controlled, and the movement amount of the focusing lens group becomes a proper value.

In place of the expression (1), it is preferable that the expression (1)' is satisfied.

$$0.5 < Y/TL < 0.7 \quad (1)'.$$

The present embodiments satisfy the following relationship, where fm is a focal length of the focusing lens group and f is a focal length of the total system of the image pickup lens:

$$0.5 < fm/f < 1.5 \quad (2).$$

When the value of the expression (2) exceeds the upper limit, the power of the focusing lens group becomes excessively weak, which enlarges the movement amount of the focusing lens group for image pickup at a close distance and makes a reduction of the total length of the image pickup lens difficult. On the other hand, when the value of the expression (2) is less than the lower limit, the power of the focusing lens group becomes excessively strong, which makes reduction of decentration sensitivity difficult even when the focusing lens group is composed of plural lenses, and makes deterioration of optical properties coming from manufacturing errors of lenses and structural components and assembling errors of lenses and structural components significant. When the value is within the expression (2), the movement amount of the focusing lens group becomes a proper value and the decentration sensitivity of the focusing lens group can be reduced.

In place of the expression (2), it is preferable that the expression (2)' is satisfied.

$$0.7 < fm/f < 1.2 \quad (2)'.$$

The present embodiments satisfy the following relationship, where fmi is a focal length of the lens located at the position closest to the image im the focusing lens group:

$$1 < |fmi/f| < 15 \quad (3).$$

Under each of the condition that the value of the expression (3) exceeds the upper limit and the condition that the value of the expression (3) becomes below the lower limit, corresponding to the movement of the focusing lens group on the optical axis, fluctuation of the height of a ray entering a stationary lens group arranged at the rear of the focusing lens group becomes large, which enlarge curvature field and deteriorates the optical properties. When the value is within the range of the expression (3), increase of curvature field corresponding to a focusing operation can be reduced.

In place of the expression (3), it is preferable that the expression (3)' is satisfied.

$$1.2 < |fmi/f| < 10 \quad (3)'$$

The present embodiments satisfy the following relationship, where rm is a curvature radius of a lens surface closest to the image in the focusing lens group and rf is a curvature radius of a lens surface located at a closest position to the subject among lenses stationarily disposed:

$$0.3 < rm/rf < 5 \quad (4)$$

Under each of the condition that the value of the expression (4) exceeds the upper limit and the condition that the value becomes below the lower limit, fluctuation of optical properties in a focusing operation becomes large, especially, fluctuation of spherical aberration and off-axis coma become large, which deteriorates the optical properties. When the value is within the range of the expression (4), fluctuation of optical properties in a focusing operation, especially, fluctuation of spherical aberration and off-axis coma can be reduced.

In place of the expression (4), it is preferable that the expression (4)' is satisfied.

$$0.6 < rm/rf < 4 \quad (4)'$$

EXAMPLES

The structures of the image pickup lens relating to the present invention will be described more concretely, by using lens construction data and aberration diagrams of examples. The scope of the invention is not limited to the examples. Examples 1 to 7 correspond to the above first to seventh embodiments and FIGS. 6 to 12.

Specifications and lens constructions of image pickup lenses of Examples 1 to 7 when the image pickup lens focuses on a subject at an infinite distance, are represented by using "Surface data", "Aspheric surface data", "Various data" and "Single lens data".

"Surface data" shows, in order from the left column, surface number "s", curvature radius "r" (unit: mm), surface distance "d" on the optical axis (unit: mm), refractive index "nd" ford line (wavelength: 587.56 nm), and Abbe number "vd" ford line. A surface represented by a surface number followed by an asterisk "*" represents an aspheric surface.

An aspheric surface is defined by the following Math. 1.

$$X = \frac{h^2/R}{1 + \sqrt{1 - (1+K)h^2/R^2}} + \sum A_i h^i \quad \text{[Math. 1]}$$

In the expression, h represents the height from the optical axis in the perpendicular direction to the optical axis, X represents a displacement amount in the optical axis direction at the height h (the vertex of the surface is the origin), R represents a paraxial curvature radius, K is a conic constant, and $A_i$ is i-th-order aspheric surface coefficient. Data relating to aspheric surfaces of Examples will be shown in Tables 2, 4, 5, 8, 10, 12 and 14. In each table, the power of 10 (for example, $2.5 \times 10^{-03}$) will be expressed as by using "e" (for example, 2.5e-003).

"Various data" shows the following signs.
Fl: Focal length of the total system of the image pickup lens (unit: mm)
Fno: F-number
w: Half angle of view (unit: degree)
y max: Maximum image height of the image plane (unit: mm)
TL: Distance in the optical axis from the surface vertex of a lens surface closest to the subject to the image surface, where the back focal length included in TL is an air-equivalent distance (unit: mm)
FB: Air-equivalent back focal length (unit: mm)

Example 1

| | Unit: mm | | | |
|---|---|---|---|---|
| | [Surface data] | | | |
| Surface No.(s) | r | d | nd | vd |
| Object plane | ∞ | ∞ | | |
| 1* | 2.110 | 0.710 | 1.54470 | 56.15 |
| 2* | −12.785 | 0.020 | | |
| 3 (Stop) | ∞ | 0.065 | | |
| 4* | 4.589 | 0.300 | 1.63200 | 23.41 |
| 5* | 1.796 | 0.410 | | |
| 6* | −11.620 | 0.710 | 1.54470 | 56.15 |
| 7* | −2.780 | 0.655 | | |
| 8* | −1.739 | 0.710 | 1.54470 | 56.15 |
| 9* | −1.083 | 0.540 | | |
| 10* | −3.659 | 0.450 | 1.54470 | 56.15 |
| 11* | 2.252 | 0.600 | | |
| 12 | ∞ | 0.145 | 1.51633 | 64.14 |
| 13 | ∞ | 0.385 | | |
| Image plane | ∞ | | | |
| [Aspheric Surface data] | | | | |

Surface No. s1

K = 1.3735e−001 A4 = −1.3036e−003 A6 = −2.4955e−003 A8 = −1.8625e−003 A10 = 1.6362e−003
A12 = 1.8966e−003 A14 = −3.7150e−003 A16 = 0.0000e+000
Surface No. s2

K = 1.9838e+001 A4 = 2.2024e−002 A6 = −4.0466e−003 A8 = −3.1273e−003 A10 = −5.2809e−003
A12 = −1.4438e−002 A14 = 1.8082e−003 A16 = 0.0000e+000

-continued

Unit: mm

Surface No. s4

K = −3.3496e+000 A4 = −5.2590e−002 A6 = 6.3796e−002 A8 = −3.5780e−002 A10 = −2.4538e−002
A12 = −2.9979e−002 A14 = 3.7822e−002 A16 = 0.0000e+000
Surface No. s5

K = −5.3443e+000 A4 = 2.9361e−002 A6 = 4.1589e−002 A8 = −1.4496e−002 A10 = −1.8974e−002
A12 = 9.2883e−003 A14 = −7.1841e−004 A16 = 0.0000e+000
Surface No. s6

K = −2.4906e+001 A4 = −2.8092e−002 A6 = 6.2970e−004 A8 = 2.4347e−002 A10 = 5.1055e−003
A12 = 1.9818e−003 A14 = −3.8256e−003 A16 = 0.0000e+000
Surface No. s7

K = 9.1778e−001 A4 = −1.1965e−002 A6 = 6.0936e−004 A8 = 5.6509e−005 A10 = 1.8772e−003
A12 = 9.2145e−004 A14 = 1.5745e−004 A16 = 0.0000e+000
Surface No. s8

K = −3.2381e−002 A4 = −1.8659e−002 A6 = 2.2732e−002 A8 = 2.8373e−003 A10 = −2.1079e−003
A12 = 3.7337e−004 A14 = 8.3156e−005 0.0000e+000
Surface No. s9

K = −2.6643e+000 A4 = −8.0075e−002 A6 = 2.7407e−002 A8 = −1.6951e−003 A10 = 8.7135e−005
A12 = −3.6247e−005 A14 = 5.2211e−007 A16 = 0.0000e+000
Surface No. s10

K = −2.9994e+001 A4 = −4.1731e−002 A6 = 7.0260e−003 A8 = −7.5662e−005 A10 = −1.2628e−004
A12 = 2.2481e−005 A14 = −1.3539e−006 A16 = 0.0000e+000
Surface No. s11

K = −1.2896e+001 A4 = −2.9764e−002 A6 = 4.2341e−003 A8 = −7.0746e−004 A10 = 8.4266e−005
A12 = −6.3061e−006 A14 = 2.2426e−007 A16 = 0.0000e+000

[Various data]

Fl 4.644
Fno. 2.884
w 37.004
y max 3.528
TL 5.656
BF 1.086

[Single lens data]

| Lens | Surface No. | Focal length |
|---|---|---|
| 1 | 1-2 | 3.382 |
| 2 | 4-5 | −4.871 |
| 3 | 6-7 | 6.525 |
| 4 | 8-9 | 3.818 |
| 5 | 10-11 | −2.492 |

When a focusing operation is performed from an infinite distance to a subject distance of 10 cm, first to third lenses move toward the subject by 0.180 mm.

Example 2

Unit: mm

[Surface data]

| Surface No.(s) | r | d | nd | vd |
|---|---|---|---|---|
| Object plane | ∞ | ∞ | | |
| 1* | 3.093 | 0.518 | 1.58913 | 61.24 |
| 2* | 305.690 | 0.064 | | |
| 3 (Stop) | ∞ | 0.414 | | |
| 4* | −3.524 | 0.350 | 1.63200 | 23.41 |
| 5* | 7160.168 | 0.158 | | |
| 6* | 5.164 | 1.139 | 1.54470 | 56.15 |
| 7* | −2.255 | 0.088 | | |

-continued

| | Unit: mm | | | |
|---|---|---|---|---|
| 8* | 28.008 | 0.399 | 1.54470 | 56.15 |
| 9* | 6.700 | 1.152 | | |
| 10* | −102.361 | 0.619 | 1.54470 | 56.15 |
| 11* | 2.233 | 0.455 | | |
| 12 | ∞ | 0.145 | 1.51600 | 64.10 |
| 13 | ∞ | 0.498 | | |
| Image plane | ∞ | | | |

[Aspheric Surface data]

Surface No. s1

K = −1.4241e+000 A4 = −2.0579e−002 A6 = −6.5954e−003 A8 = −1.7022e−002 A10 = 1.5702e−002
A12 = −1.1341e−002 A14 = 2.2460e−003 A16 = 0.0000e+000 A18 = 0.0000e+000 A20 = 0.0000e+000
Surface No. s2

K = −5.3530e+005 A4 = −4.6670e−002 A6 = −2.8532e−003 A8 = −2.8012e−002 A10 = 5.4124e−002
A12 = −5.2325e−002 A14 = 1.8235e−002 A16 = 0.0000e+000 A18 = 0.0000e+000 A20 = 0.0000e+000
Surface No. s4

K = −3.8460e+000 A4 = −6.4781e−002 A6 = 1.1760e−001 A8 = −1.2550e−001 A10 = 8.2698e−002
A12 = 5.1957e−003 A14 = −3.3205e−002 A16 = 0.0000e+000 A18 = 0.0000e+000 A20 = 0.0000e+000
Surface No. s5

K = −2.4112e+009 A4 = −1.0389e−001 A6 = 2.2431e−001 A8 = −2.4444e−001 A10 = 2.0334e−001
A12 = −9.9205e−002 A14 = 1.9871e−002 A16 = −7.3342e−004 A18 = −7.15304E−04 A20 = 6.00200E−04
Surface No. s6

K = −9.0503e+001 A4 = −2.7118e−002 A6 = 2.8755e−002 A8 = −1.7438e−002 A10 = 5.2812e−003
A12 = −2.5675e−004 A14 = −1.9077e−004 A16 = 0.0000e+000 A18 = 0.0000e+000 A20 = 0.0000e+000
Surface No. s7

K = −1.1139e−001 A4 = −1.3314e−002 A6 = −2.7155e−003 A8 = −9.1250e−004 A10 = −4.8037e−004
A12 = −8.5373e−005 A14 = 3.7482e−005 A16 = 0.0000e+000 A18 = 0.0000e+000 A20 = 0.0000e+000
Surface No. s8

K = 0.0000e+000 A4 = −2.2349e−002 A6 = −2.0542e−003 A8 = −3.1736e−003 A10 = 2.1273e−004
A12 = 2.4503e−005 A14 = −7.1008e−005 A16 = 0.0000e+000 A18 = 0.0000e+000 A20 = 0.0000e+000
Surface No. s9

K = 0.0000e+000 A4 = −1.3116e−002 A6 = −9.0098e−004 A8 = −5.2550e−004 A10 = −8.1182e−005
A12 = 2.7656e−005 A14 = −1.6089e−006 A16 = 0.0000e+000 A18 = 0.0000e+000 A20 = 0.0000e+000
Surface No. s10

K = 0.0000e+000 A4 = −1.2662e−001 A6 = 2.3965e−002 A8 = −1.9989e−003 A10 = −2.0814e−004
A12 = 9.4413e−005 A14 = −6.6522e−006 A16 = 0.0000e+000 A18 = 0.0000e+000 A20 = 0.0000e+000
Surface No. s11

K = −8.8902e+000 A4 = −4.5365e−002 A6 = 9.3394e−003 A8 = −1.4017e−003 A10 = 1.1564e−004
A12 = −4.8278e−006 A14 = 1.2485e−007 A16 = 0.0000e+000 A18 = 0.0000e+000 A20 = 0.0000e+000

[Various data]

Fl 4.748
Fno. 2.884
w 37.952
y max 3.528
TL 5.949
BF 1.049

[Single lens data]

| Lens | Surface No. | Focal length |
|---|---|---|
| 1 | 1-2 | 5.300 |
| 2 | 4-5 | −5.572 |
| 3 | 6-7 | 3.047 |
| 4 | 8-9 | −16.276 |
| 5 | 10-11 | −4.003 |

When a focusing operation is performed from an infinite distance to a subject distance of 10 cm, first to fourth lenses move toward the subject by 0.145 mm.

Example 3

Unit: mm

[Surface data]

| Surface No.(s) | r | d | nd | vd |
|---|---|---|---|---|
| Object plane | ∞ | ∞ | | |
| 1* | 1.741 | 0.911 | 1.54470 | 56.15 |
| 2* | −15.045 | 0.020 | | |
| 3 (Stop) | ∞ | 0.070 | | |
| 4* | 47.638 | 0.300 | 1.63200 | 23.41 |
| 5* | 2.776 | 0.512 | | |
| 6* | −7.760 | 0.495 | 1.63200 | 23.41 |
| 7* | −5.471 | 0.524 | | |
| 8* | −3.544 | 0.869 | 1.54470 | 56.15 |
| 9* | −1.465 | 0.438 | | |
| 10* | −2.939 | 0.450 | 1.54470 | 56.15 |
| 11* | 3.241 | 0.600 | | |
| 12 | ∞ | 0.145 | 1.51633 | 64.14 |
| 13 | ∞ | 0.366 | | |
| Image plane | ∞ | | | |

[Aspheric Surface data]

Surface No. s1

$K = 5.6578e-002$ $A4 = -3.8384e-003$ $A6 = -2.4813e-003$ $A8 = -2.6675e-003$ $A10 = 5.6963e-005$
$A12 = 4.5840e-004$ $A14 = -9.6060e-004$ $A16 = 0.0000e+000$

Surface No. s2

$K = -3.0000e+001$ $A4 = 8.3920e-003$ $A6 = 3.4618e-003$ $A8 = 1.9778e-004$ $A10 = -6.1346e-003$
$A12 = -8.6245e-003$ $A14 = 6.8234e-003$ $A16 = 0.0000e+000$

Surface No. s4

$K = -3.0010e+001$ $A4 = 9.2225e-003$ $A6 = 4.5646e-002$ $A8 = -2.8388e-002$ $A10 = 9.2717e-003$
$A12 = -2.8557e-003$ $A14 = -1.2337e-003$ $A16 = 0.0000e+000$

Surface No. s5

$K = -1.8989e+000$ $A4 = 2.4160e-002$ $A6 = 6.2322e-002$ $A8 = -4.2455e-002$ $A10 = 5.2383e-002$
$A12 = -1.3455e-002$ $A14 = -6.4360e-004$ $A16 = 0.0000e+000$

Surface No. s6

$K = 1.0151e+001$ $A4 = -4.6549e-002$ $A6 = -2.1802e-002$ $A8 = 3.8611e-002$ $A10 = -9.2703e-003$
$A12 = -3.1188e-002$ $A14 = 2.2473e-002$ $A16 = 0.0000e+000$

Surface No. s7

$K = 3.2195e+000$ $A4 = -2.8557e-002$ $A6 = 5.8197e-003$ $A8 = 1.3286e-003$ $A10 = -6.1585e-004$
$A12 = 3.0164e-004$ $A14 = -4.6265e-005$ $A16 = 0.0000e+000$

Surface No. s8

$K = 1.1099e+000$ $A4 = -3.1386e-002$ $A6 = 1.4448e-002$ $A8 = -3.4807e-003$ $A10 = -3.3301e-004$
$A12 = 2.5191e-004$ $A14 = -2.9777e-006$ $A16 = 0.0000e+000$

Surface No. s9

$K = -2.8409e+000$ $A4 = -3.9030e-002$ $A6 = 1.1960e-002$ $A8 = -1.7698e-003$ $A10 = 2.9007e-004$
$A12 = -2.9318e-005$ $A14 = 1.1551e-006$ $A16 = 0.0000e+000$

Surface No. s10

$K = -1.6643e+000$ $A4 = -2.8402e-002$ $A6 = 1.0087e-002$ $A8 = -4.5069e-004$ $A10 = -1.6285e-004$
$A12 = 2.5189e-005$ $A14 = -1.1050e-006$ $A16 = 0.0000e+000$

Surface No. s11

$K = -2.3016e+001$ $A4 = -3.4067e-002$ $A6 = 5.1715e-003$ $A8 = -6.7018e-004$ $A10 = 6.0510e-005$
$A12 = -4.9001e-006$ $A14 = 2.4886e-007$ $A16 = 0.0000e+000$

-continued

| Unit: mm | | |
|---|---|---|
| [Various data] | | |

Fl 5.136
Fno. 2.880
w 34.308
y max 3.528
TL 5.662
BF 1.073

[Single lens data]

| Lens | Surface No. | Focal length |
|---|---|---|
| 1 | 1-2 | 2.920 |
| 2 | 4-5 | −4.677 |
| 3 | 6-7 | 27.087 |
| 4 | 8-9 | 3.996 |
| 5 | 10-11 | −2.759 |

When a focusing operation is performed from an infinite distance to a subject distance of 10 cm, first to third lenses move toward the subject by 0.243 mm.

Example 4

| Unit: mm | | | | |
|---|---|---|---|---|
| [Surface data] | | | | |
| Surface No.(s) | r | d | nd | vd |
| Object plane | ∞ | ∞ | | |
| 1 (Stop) | ∞ | 0.000 | | |
| 2* | 2.035 | 0.740 | 1.54470 | 56.15 |
| 3* | −17.714 | 0.050 | | |
| 4* | 6.907 | 0.300 | 1.63200 | 23.41 |
| 5* | 2.092 | 0.488 | | |
| 6* | −24.385 | 0.748 | 1.54470 | 56.15 |
| 7* | −3.666 | 0.434 | | |
| 8* | −2.349 | 0.716 | 1.54470 | 56.15 |
| 9* | −1.231 | 0.590 | | |
| 10* | −16.054 | 0.450 | 1.54470 | 56.15 |
| 11* | 1.550 | 0.600 | | |
| 12 | ∞ | 0.145 | 1.51633 | 64.14 |
| 13 | ∞ | 0.440 | | |
| Image plane | ∞ | | | |

[Aspheric Surface data]

Surface No. s2

$K = 3.3237e-001$ $A4 = 3.4378e-003$ $A6 = 3.8374e-003$ $A8 = -3.5320e-003$ $A10 = 6.4216e-003$
$A12 = 1.0336e-002$ $A14 = -9.8057e-003$ $A16 = 0.0000e+000$
Surface No. s3

$K = -3.0000e+001$ $A4 = 3.9813e-002$ $A6 = -1.6793e-003$ $A8 = 1.6248e-002$ $A10 = 1.2872e-002$
$A12 = -7.6262e-004$ $A14 = -6.0888e-003$ $A16 = 0.0000e+000$
Surface No. s4

$K = -1.9269e+000$ $A4 = -4.1546e-002$ $A6 = 3.6000e-002$ $A8 = -1.4197e-003$ $A10 = -1.3368e-003$
$A12 = -1.8049e-003$ $A14 = -1.4206e-003$ $A16 = 0.0000e+000$
Surface No. s5

$K = -6.4920e+000$ $A4 = 1.6004e-002$ $A6 = 2.7946e-002$ $A8 = -1.0170e-002$ $A10 = 8.7064e-004$
$A12 = -1.4371e-003$ $A14 = 8.7548e-004$ $A16 = 0.0000e+000$
Surface No. s6

$K = -3.0000e+001$ $A4 = -2.6372e-002$ $A6 = -1.2850e-003$ $A8 = 8.6676e-003$ $A10 = 2.0735e-003$
$A12 = 3.3470e-004$ $A14 = -5.0924e-004$ $A16 = 0.0000e+000$

-continued

Unit: mm

Surface No. s7

K = 1.1380e+000 A4 = −1.4195e−002 A6 = −4.0305e−003 A8 = −1.3371e−004 A10 = 7.9556e−004
A12 = 2.8981e−004 A14 = 8.3163e−005 A16 = 0.0000e+000
Surface No. s8

K = −5.5814e−002 A4 = 1.4907e−002 A6 = 1.1162e−003 A8 = 6.5121e−004 A10 = −2.7243e−004
A12 = −3.9159e−005 A14 = 2.8576e−005 A16 = 0.0000e+000
Surface No. s9

K = −3.0900e+000 A4 = −4.2743e−002 A6 = 1.8426e−002 A8 = −2.2844e−003 A10 = 1.1276e−004
A12 = −1.3921e−005 A14 = 4.8328e−006 A16 = 0.0000e+000
Surface No. s10

K = 2.2413e+001 A4 = −4.6008e−002 A6 = 7.2016e−003 A8 = −1.5438e−004 A10 = −1.1167e−004
A12 = 2.4325e−005 A14 = −1.5890e−006 A16 = 0.0000e+000
Surface No. s11

K = −7.4294e+000 A4 = −3.40656e−002 A6 = 6.2038e−003 A8 = −9.1923e−004 A10 = 7.4308e−005
A12 = −3.1095e−006 A14 = 6.1432e−008 A16 = 0.0000e+000

[Various data]

Fl 4.549
Fno. 2.880
w 37.602
y max 3.528
TL 5.665
BF 1.149

[Single lens data]

| Lens | Surface No. | Focal length |
|---|---|---|
| 1 | 1-2 | 5.770 |
| 2 | 4-5 | −4.866 |
| 3 | 6-7 | 7.821 |
| 4 | 8-9 | 3.874 |
| 5 | 10-11 | −2.572 |

When a focusing operation is performed from an infinite distance to a subject distance of 10 cm, first to third lenses move toward the subject by 0223 mm.

Example 5

[Surface data]

| Surface No.(s) | r | d | nd | vd |
|---|---|---|---|---|
| Object plane | ∞ | ∞ | | |
| 1* | 1.666 | 0.820 | 1.54470 | 56.15 |
| 2* | −18.998 | 0.020 | | |
| 3 (Stop) | ∞ | 0.070 | | |
| 4* | 30.109 | 0.270 | 1.63200 | 23.41 |
| 5* | 2.917 | 0.533 | | |
| 6* | −4.011 | 0.483 | 1.63200 | 23.41 |
| 7* | −3.572 | 0.450 | | |
| 8* | −4.535 | 0.819 | 1.54470 | 56.15 |
| 9* | −1.823 | 0.744 | | |
| 10* | −1.697 | 0.450 | 1.62971 | 50.30 |
| 11* | 519.551 | 0.327 | | |
| 12 | ∞ | 0.411 | | |
| Image plane | ∞ | | | |

[Aspheric Surface data]

Surface No. s1

K = −9.0835e−003 A4 = −5.3029e−003 A6 = 6.1939e−004 A8 = −8.8472e−003 A10 = 4.4408e−004
A12 = 1.8605e−003 A14 = −3.1735e−003 A16 = 0.0000e+000

-continued

Surface No. s2

K = −5.0000e+001 A4 = 6.4507e−003 A6 = −9.5468e−003 A8 = 6.0733e−003 A10 = −5.7496e−003
A12 = −2.9120e−002 A14 = 2.3702e−002 A16 = 0.0000e+000

Surface No. s4

K = 2.3045e+001 A4 = 2.9759e−002 A6 = 3.0766e−002 A8 = −3.9498e−002 A10 = 6.8657e−002
A12 = −5.6360e−002 A14 = −5.0575e−004 A16 = 0.0000e+000

Surface No. s5

K = 5.6138e−001 A4 = 3.7403e−002 A6 = 5.3414e−002 A8 = −4.0337e−002 A10 = 9.3197e−002
A12 = −4.3382e−002 A14 = −2.6385e−004 A16 = 0.0000e+000

Surface No. s6

K = 6.0547e+000 A4 = −4.8941e−002 A6 = −2.3104e−002 A8 = 5.1432e−002 A10 = −7.3129e−003
A12 = −4.6935e−002 A14 = 3.8891e−002 A16 = 0.0000e+000

Surface No. s7

K = 2.0329e+000 A4 = −2.2104e−002 A6 = −2.8834e−004 A8 = 6.7031e−003 A10 = 1.4227e−003
A12 = 1.9302e−004 A14 = −3.6898e−004 A16 = 0.0000e+000

Surface No. s8

K = −1.6798e+000 A4 = −1.8481e−002 A6 = 1.2303e−002 A8 = −4.0321e−003 A10 = 1.7316e−004
A12 = 2.5859e−004 A14 = −6.1955e−005 A16 = 0.0000e+000

Surface No. s9

K = −2.7038e+000 A4 = −2.3692e−002 A6 = 1.2174e−002 A8 = −1.1857e−003 A10 = 5.1281e−005
A12 = −2.6199e−005 A14 = 9.1959e−007 A16 = 0.0000e+000

Surface No. s10

K = −2.5193e+000 A4 = −1.9368e−002 A6 = 7.4144e−003 A8 = −2.9854e−004 A10 = −9.5134e−005
A12 = 1.1269e−005 A14 = −3.4300e−007 A16 = 0.0000e+000

Surface No. s11

K = 2.9367e+004 A4 = −2.6235e−002 A6 = 3.6566e−003 A8 = −4.5778e−004 A10 = 3.2109e−005
A12 = −2.2944e−006 A14 = 1.5566e−007 A16 = 0.0000e+000

[Various data]

Fl 4.950
Fno. 2.888
w 35.453
y max 3.528
TL 5.397
BF 0.737

[Single lens data]

| Lens | Surface No. | Focal length |
|---|---|---|
| 1 | 1-2 | 2.852 |
| 2 | 4-5 | −5.131 |
| 3 | 6-7 | 36226 |
| 4 | 8-9 | 5.058 |
| 5 | 10-1 | −2.686 |

When a focusing operation is performed from an infinite distance to a subject distance of 10 cm, first to third lenses move toward the subject by 0.228 mm.

Example 6

[Surface data]

| Surface No.(s) | r | d | nd | vd |
|---|---|---|---|---|
| Object plane | ∞ | ∞ | | |
| 1* | 1.720 | 0.963 | 1.54470 | 56.15 |
| 2* | −23.558 | 0.030 | | |
| 3 (Stop) | ∞ | 0.070 | | |
| 4* | 47.467 | 0.300 | 1.63200 | 23.41 |
| 5* | 2.945 | 0.608 | | |
| 6* | −6.119 | 0.645 | 1.63200 | 23.41 |
| 7* | −5.324 | 0.360 | | |

-continued

| | | | | |
|---|---|---|---|---|
| 8* | −1.991 | 0.684 | 1.54470 | 56.15 |
| 9* | −1.322 | 0.449 | | |
| 10* | −14.605 | 0.500 | 1.54470 | 56.15 |
| 11* | 2.385 | 0.600 | | |
| 12 | ∞ | 0.145 | 1.51633 | 64.14 |
| 13 | ∞ | 0.662 | | |
| Image plane | ∞ | | | |

[Aspheric Surface data]

Surface No. s1

K = 5.3402e−002 A4 = −4.5821e−003 A6 = −4.1569e−003 A8 = −3.1982e−003 A10 = 6.0924e−004
A12 = −7.3947e−004 A14 = −5.5630e−004 A16 = 0.0000e+000
Surface No. s2

K = 3.0000e+001 A4 = −1.1722e−002 A6 = 6.4982e−003 A8 = 1.3633e−003 A10 = −7.2007e−003
A12 = −1.5553e−003 A14 = 1.9025e−003 A16 = 0.0000e+000
Surface No. s4

K = −3.0000e+001 A4 = 3.2885e−003 A6 = 4.4481e−002 A8 = −1.9144e−002 A10 = 7.8797e−003
A12 = −3.7681e−004 A14 = 1.0763e−004 A16 = 0.0000e+000
Surface No. s5

K = −6.5507e−001 A4 = 2.9332e−002 A6 = 5.5075e−002 A8 = −2.1644e−002 A10 = 1.0862e−002
A12 = 2.0760e−002 A14 = −1.0010e−003 A16 = 0.0000e+000
Surface No. s6

K = 7.0484e+000 A4 = −6.0050e−002 A6 = −2.7703e−002 A8 = 7.2650e−003 A10 = −5.1157e−003
A12 = −4.3306e−003 A14 = −6.8395e−003 A16 = 0.0000e+000
Surface No. s7

K = 1.1434e+001 A4 = −1.9137e−002 A6 = −9.5346e−003 A8 = 4.5815e−003 A10 = 1.8352e−005
A12 = −9.8397e−004 A14 = 2.0748e−004 A16 = 0.0000e+000
Surface No. s8

K = −1.5781e+000 A4 = −6.3011e−003 A6 = 1.7851e−003 A8 = 8.1541e−004 A10 = 4.5137e−005
A12 = −1.2833e−005 A14 = −3.3164e−006 A16 = 0.0000e+000
Surface No. s9

K = −2.8206e+000 A4 = −3.6014e−002 A6 = 1.7500e−002 A8 = −2.7665e−003 A10 = 3.5659e−004
A12 = −1.2952e−005 A14 = −4.4673e−006 A16 = 0.0000e+000
Surface No. s10

K = 1.4737e+001 A4 = −3.9323e−002 A6 = 1.0290e−002 A8 = −5.2607e−004 A10 = −1.9505e−004
A12 = 3.7292e−005 A14 = −1.9742e−006 A16 = 0.0000e+000
Surface No. s11

K = −1.3974e+001 A4 = −3.9548e−002 A6 = 6.8986e−003 A8 = −9.0503e−004 A10 = 8.0310e−005
A12 = −5.9310e−006 A14 = 2.7988e−007 A16 = 0.0000e+000

[Various data]

Fl 5.540
Fno. 2.883
w 32.259
y max 3.528
TL 5.966
BF 1.357

[Single lens data]

| Lens | Surface No. | Focal length |
|---|---|---|
| 1 | 1-2 | 2.983 |
| 2 | 4-5 | −4.981 |
| 3 | 6-7 | 49.323 |
| 4 | 8-9 | 5.304 |
| 5 | 10-11 | −3.726 |

When a focusing operation is performed from an infinite distance to an subject distance of 10 cm, first to third lenses move toward the subject by 0.274 mm.

Example 7

| [Surface data] | | | | |
|---|---|---|---|---|
| Surface No.(s) | r | d | nd | vd |
| Object plane | ∞ | ∞ | | |
| 1* | 1.571 | 0.875 | 1.54470 | 56.15 |
| 2* | 15.189 | 0.055 | | |
| 3 (Stop) | ∞ | 0.050 | | |
| 4* | 7.824 | 0.100 | 1.63200 | 23.41 |
| 5* | 1.950 | 0.308 | | |
| 6* | 40.312 | 0.412 | 1.63200 | 23.41 |
| 7* | −17.171 | 0.761 | | |
| 8* | −5.611 | 1.021 | 1.54470 | 56.15 |
| 9* | −1.402 | 0.584 | | |
| 10* | −2.423 | 0.450 | 1.54470 | 56.15 |
| 11* | 3.471 | 0.440 | | |
| 12 | ∞ | 0.145 | 1.51633 | 64.14 |
| 13 | ∞ | 0.516 | | |
| Image plane | ∞ | | | |

[Aspheric Surface data]

Surface No. s1

K = 8.3130e−001 A4 = −1.0268e−002 A6 = −4.2689e−003 A8 = −4.3147e−003 A10 = 4.2401e−003
A12 = −2.4172e−003 A14 = −7.5305e−004 A16 = 0.0000e+000
Surface No. s2

K = 6.8651e+001 A4 = 8.9811e−002 A6 = −2.9703e−002 A8 = 6.1974e−002 A10 = −1.1922e−002
A12 = 2.5853e−002 A14 = 1.7162e−002 A16 = 0.0000e+000
Surface No. s4

K = −7.0000e+001 A4 = −5.6006e−002 A6 = 1.0710e−001 A8 = −1.7971e−001 A10 = 8.7586e−002
A12 = −2.3393e−003 A14 = 9.7877e−005 A16 = 0.0000e+000
Surface No. s5

K = −8.8402e+000 A4 = 3.9474e−002 A6 = 7.2314e−002 A8 = −1.2762e−001 A10 = 9.1917e−002
A12 = −2.7951e−002 A14 = 2.6160e−004 A16 = 0.0000e+000
Surface No. s6

K = 7.0000e+001 A4 = −5.2533e−003 A6 = −3.9345e−003 A8 = 2.2647e−002 A10 = −9.9634e−003
A12 = 6.7941e−003 A14 = −5.7345e−003 A16 = 0.0000e+000
Surface No. s7

K = −7.0000e+001 A4 = −7.6440e−004 A6 = 8.4281e−003 A8 = −1.8005e−002 A10 = 1.6989e−002
A12 = −4.8745e−003 A14 = −2.5855e−004 A16 = 0.0000e+000
Surface No. s8

K = 3.2625e+000 A4 = −1.6212e−002 A6 = 1.1989e−002 A8 = −2.2181e−003 A10 = −6.2548e−004
A12 = 4.6498e−004 A14 = −7.1685e−005 A16 = 0.0000e+000
Surface No. s9

K = −2.8792e+000 A4 = −4.2948e−002 A6 = 1.0855e−002 A8 = −7.1437e−004 A10 = 4.3950e−004
A12 = −7.5454e−005 A14 = −1.0303e−006 A16 = 0.0000e+000
Surface No. s10

K = −7.5911e+000 A4 = −4.3692e−002 A6 = 1.1221e−002 A8 = −3.0259e−004 A10 = −1.7435e−004
A12 = 2.2224e−005 A14 = −−8.5489e−007 A16 = 0.0000e+000
Surface No. s11

K = −2.2430e+001 A4 = −2.5878e−002 A6 = 4.0604e−003 A8 = −6.4925e−004 A10 = 7.1685e−005
A12 = −4.1703e−006 A14 = 9.6628e−008 A16 = 0.0000e+000

[Various data]

Fl 4.956
Fno. 2.880
w 35.169
y max 3.528
TL 5.666
BF 1.051

-continued

[Single lens data]

| Lens | Surface No. | Focal length |
|---|---|---|
| 1 | 1-2 | 3.146 |
| 2 | 4-5 | −4.136 |
| 3 | 6-7 | 19.107 |
| 4 | 8-9 | 3.162 |
| 5 | 10-11 | −2.551 |

When a focusing operation is performed from an infinite distance to a subject distance of 10 cm, first to third lenses move toward the subject by 0.357 mm.

Table 1 shows values corresponding to the conditional expressions (1) to (4) for respective Examples.

TABLE 1

|  | Example 1 | Example 2 | Example 3 | Example 4 | Example 5 | Example 6 | Example 7 |
|---|---|---|---|---|---|---|---|
| Expression (1) Y'/TL | 0.624 | 0.593 | 0.623 | 0.623 | 0.654 | 0.591 | 0.623 |
| Expression (2) fm/f | 0.907 | 0.791 | 0.948 | 1.011 | 0.942 | 0.917 | 1.163 |
| Expression (3) \|fmi/f\| | 1.405 | 3.428 | 5.274 | 1.719 | 7.319 | 8.903 | 3.855 |
| Expression (4) em/rf | 1.599 | −0.065 | 1.544 | 1.561 | 0.788 | 2.673 | 3.061 |

FIGS. 13a to 19b show aberration diagrams of Examples 1 to 7. FIGS. 13a, 14a, 15a, 16a, 17a, 18a, and 19a are aberrations diagrams when the subject at infinite distance is in focus, and FIGS. 13b, 14b, 15b, 16b, 17b, 18b, and 19b are aberration diagrams when the subject at the subject distance of 10 cm is in focus. As for the spherical aberration of each aberration diagram, line c represents the aberration amount for C line (wavelength: 656.28 nm), line d represents the aberration amount for d line (wavelength: 587.56 nm) and line g represents the aberration amount for g line (wavelength: 435.84 nm). As for the astigmatism of each aberration diagram, line T and line S represent aberration amounts in the meridional surface and sagittal surface, respectively. The unit of the horizontal axis for the spherical aberration and astigmatism is mm, the unit of the horizontal axis for the distortion is percentage (%).

In Examples 1 to 7, aberrations are corrected in excellent conditions when the subject at an infinite distance is in focus and when the subject at the subject distance of 10 cm is infocus.

INDUSTRIAL APPLICABILITY

The present invention can be applied to an image pickup lens which can guide light to an image pickup element, an image pickup device equipped with the image pickup lens, and a mobile terminal equipped with the image pickup device. Especially, the present invention can be applied to an image pickup lens which can perform a focusing operation, an image pickup device equipped with the image pickup lens, and a mobile terminal equipped with the image pickup device.

REFERENCE SIGNS LIST

10 Image pickup lens
11 Focusing lens group
13 Stationary lens group
20 Lens barrel
21 Fixed barrel
21a Straight guide groove
22 Focusing lens barrel
22a Guide projection section
22b Slider hole
23 Piezoelectric element (Actuator)
25 Drive shaft
50 Image pickup device
51 Imaging sensor (Image pickup element)
52 Substrate
100 Cell phone (Mobile terminal)
222 Movable barrel
223 Voice coil motor (Actuator)
224 Magnet
225 Coil
226, 227 Spring member
321 Fixed barrel
321b Support receiving section
322 Movable barrel
322a Cam follower
323 SMA motor (Acutator)
324 SMA wire
325 Drive member
325a Cam section
325b Support section
F Filter
L1-L5 Lenses
s1-s13 Surfaces

The invention claimed is:

1. An image pickup lens for forming light from a subject into an image on an image pickup element, comprising in order from the subject:

a first lens with positive power, comprising a convex surface facing the subject;
a second lens with negative power;
a third lens with positive or negative power;
a fourth lens with positive or negative power; and
a fifth lens comprising one surface in an aspheric shape including an inflection point at a position excluding an intersection of the one surface and the optical axis, wherein a lens closest to the image pickup element is stationarily disposed, and a focusing operation is performed by moving a focusing lens group including a plurality of lenses in a direction of an optical axis, where the plurality of lenses include a lens closest to the subject.

2. An image pickup lens for forming light from a subject into an image on an image pickup element, wherein a lens closest to the image pickup element is stationarily disposed, and a focusing operation is performed by moving a focusing lens group including a plurality of lenses in a direction of an optical axis, where the plurality of lenses include a lens closest to the subject, and wherein the following conditional expression is satisfied:

$0.591 < Y/TL < 0.8$, where Y is a maximum image height on an image plane of the image pickup element, and TL is a distance on an optical axis from a surface apex of a lens surface closest to the subject to the image plane, when a subject at an infinite distance is in focus.

3. The image pickup lens of claim 2,
wherein the focusing lens group comprises three lenses.

4. The image pickup lens of claim 2
wherein the lens closest to the subject has a diameter which is smaller than a diameter of the lens closest to the image pickup element.

5. The image pickup lens of claim 2, satisfying:

$0.5 < fm/f < 1.5$, where fm is a focal length of the focusing lens group and f is a focal length of a total system of the image pickup lens.

6. The image pickup lens of claim 2, satisfying:

$1 < |fmi/f| < 15$, where fmi is a focal length of a lens closest to the image in the focusing lens group and
f is a focal length of a total system of the image pickup lens.

7. The image pickup lens of claim 2, satisfying:

$0.3 < rm/rf < 5$, where rm is a curvature radius of a lens surface closest to the image in the focusing lens group and rf is a curvature radius of a lens surface closest to the subject among lenses stationarily disposed.

8. The image pickup lens of claim 2, comprising in order from the subject:

a first lens with positive power, comprising a convex surface facing the subject;

a second lens with negative power, comprising a concave surface facing the image;

a third lens with positive or negative power;

a fourth lens with positive power, comprising a convex surface facing the image; and a fifth lens with negative power, comprising a concave surface facing the image, wherein the focusing lens group consists of the first to third lenses.

9. The image pickup lens of claim 2, comprising in order from the subject:

a first lens with positive power, comprising a convex surface facing the subject;

a second lens with negative power, comprising a concave surface facing the subject;

a third lens with positive power;

a fourth lens with positive or negative power; and a fifth lens with positive or negative power, wherein the focusing lens group consists of the first to fourth lenses.

10. An image pickup device comprising:
the image pickup lens of claim 2; and
an actuator for driving the focusing lens group.

11. The image pickup device of claim 10,
wherein the image pickup lens includes at least five lenses.

12. The image pickup device of claim 10
wherein the actuator comprises a piezoelectric element.

13. The image pickup device of claim 10
wherein the actuator comprises a voice coil motor.

14. The image pickup device of claim 10
wherein the actuator comprises shape memory alloy.

15. A mobile terminal comprising the image pickup device of claim 10.

* * * * *